United States Patent
Li et al.

(10) Patent No.: US 10,805,630 B2
(45) Date of Patent: Oct. 13, 2020

(54) GRADIENT BASED MATCHING FOR MOTION SEARCH AND DERIVATION

(71) Applicant: QUALCOMM Incorporated, San Diego, CA (US)

(72) Inventors: Xiang Li, San Diego, CA (US); Yi-Wen Chen, San Diego, CA (US); Jianle Chen, San Diego, CA (US); Hsiao-Chiang Chuang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 15/963,867

(22) Filed: Apr. 26, 2018

(65) Prior Publication Data

US 2018/0316929 A1   Nov. 1, 2018

Related U.S. Application Data

(60) Provisional application No. 62/491,744, filed on Apr. 28, 2017.

(51) Int. Cl.
*H04N 19/577*  (2014.01)
*H04N 19/52*  (2014.01)
(Continued)

(52) U.S. Cl.
CPC ......... *H04N 19/577* (2014.11); *H04N 19/105* (2014.11); *H04N 19/14* (2014.11);
(Continued)

(58) Field of Classification Search
None
See application file for complete search history.

(56) References Cited

U.S. PATENT DOCUMENTS

2010/0135395 A1*   6/2010   Servais ............... H04N 19/139
                                                       375/240.16
2013/0083851 A1*   4/2013   Alshin ................ H04N 19/182
                                                       375/240.14
(Continued)

OTHER PUBLICATIONS

L.K. Liu & E. Feig, "A block-based gradient descent search algorithm for block motion estimation in video coding", 6 IEEE Transactions on Circuits & Sys. for Video Tech. 419-422 (Aug. 1996) (Year: 1996).*

(Continued)

*Primary Examiner* — David N Werner
(74) *Attorney, Agent, or Firm* — Shumaker & Sieffert, P.A.

(57) ABSTRACT

A method of decoding video data includes determining, by a video decoder implemented in circuitry, a bi-predicted MV predictor for a block of video data. The bi-predicted MV predictor indicates a first input reference block and a second input reference block. The method further includes refining, by the video decoder, the bi-predicted MV predictor using gradient information to determine a refined bi-predicted MV predictor indicating a first refined reference block that is within a search range from the first input reference block and a second refined reference block that is within the search range from the second input reference block. The method further includes generating, by the video decoder, a predictive block for the block of video data based on the refined bi-predicted MV predictor, and decoding, by the video decoder, the block of video data based on the predictive block.

28 Claims, 13 Drawing Sheets

(51) Int. Cl.

| | |
|---|---|
| *H04N 19/573* | (2014.01) |
| *H04N 19/176* | (2014.01) |
| *H04N 19/58* | (2014.01) |
| *H04N 19/57* | (2014.01) |
| *H04N 19/44* | (2014.01) |
| *H04N 19/533* | (2014.01) |
| *H04N 19/56* | (2014.01) |
| *H04N 19/192* | (2014.01) |
| *H04N 19/14* | (2014.01) |
| *H04N 19/105* | (2014.01) |

(52) U.S. Cl.
CPC ......... *H04N 19/176* (2014.11); *H04N 19/192* (2014.11); *H04N 19/44* (2014.11); *H04N 19/52* (2014.11); *H04N 19/533* (2014.11); *H04N 19/56* (2014.11); *H04N 19/57* (2014.11); *H04N 19/573* (2014.11); *H04N 19/58* (2014.11)

(56) References Cited

U.S. PATENT DOCUMENTS

| | | | |
|---|---|---|---|
| 2013/0294519 A1 | 11/2013 | Gilmutdinov et al. | |
| 2014/0294320 A1* | 10/2014 | Kokaram | H04N 19/577 382/275 |
| 2016/0286229 A1 | 9/2016 | Li et al. | |
| 2018/0249172 A1* | 8/2018 | Chen | H04N 19/577 |

OTHER PUBLICATIONS

Alshin A., et al., "Bi-Directional Optical flow for Improving Motion Compensation", 28th Picture Coding Symposium, PCS2010, Samsung Electronics Co., Ltd, Dec. 8-10, 2010, Nagoya, Japan, 4 pp.
An J., et al., "Block partitioning structure for next generation video coding," International Telecommunication Union, Com 16-C966 R3-E, Sep. 2015, 8 pp.
Alshina E., et al., "Known tools performance investigation for next generation video coding", ITU—Telecommunications Standardisation Sector, Video Coding Experts Group (VCEG), 52nd Meeting: Jun. 19-26, 2015, Warsaw, Poland, VCEG-AZ05, 5 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Chen, X., et al., "Decoder-Side Motion Vector Refinement Based on Bilateral Template Matching", Joint Video Exploration Team (JVET) of ITU-T SG16 WP3 and ISO/IEC JTC1/SC29/WG11, 4th Meeting: Chengdu, CN, Oct. 15-21, 2016, JVET-D0029, 4 pp.
Wikipedia, "Sobel operator" retrieved from https://en.wikipedia.org/wiki/Sobel operator, Apr. 26, 2018, 8 pp.
Tham J. et al., "A Novel Unrestricted Center-Biased Diamond Search Algorithm for Block Motion Estimation", IEEE Transactions on Circuits and Systems for Video Technology, vol. 8, No. 4, Aug. 4, 1998, 9 pp.
U.S. Appl. No. 62/403,057, filed Sep. 30, 2016 entitled Improvements on Frame-Rate Up-Conversion (FRUC).
Li, L., et al., "An Affine Motion Compensation Framework for High Efficiency Video Coding", IEEE International Symposium on Circuits and Systems (ISCAS), Lisbon, 2015, pp. 525-528.
Liu, L., et al., "A Block-Based Gradient Descent Search Algorithm for Block Motion Estimation in Video Coding", IEEE Transactions on Circuits and Systems for Video Technology, vol. 6, No. 4, Aug. 1996, pp. 419-422.
Alshin A., et al., "EE3: Cross-Check for Decoder-Side Motion Vector Refinement Based on Bilateral Template Matching," Joint Video Exploration Team (JVET) of ITU-T SG16 WP3 and ISO/IEC JTC1/SC29/WG11, 5th Meeting: Geneva, CH, Jan. 12-20, 2017, JVET-E0049, 2 pp.
Chen J., et al., "Algorithm Description of Joint Exploration Test Model 5 (JEM5)", Joint Video Exploration Team (JVET) of ITU-T SG16 WP3 and ISO/IEC JTC1/SC29/WG11, 5th Meeting: Geneva, CH, Jan. 12-20, 2017, JVET-E1001-v2, 44 pp.
International Search Report and Written Opinion of International Application No. PCT/US2018/029804, dated Jul. 4, 2018, 16 pp.
International Preliminary Report on Patentability from corresponding PCT Application Serial No. PCT/US2018/029804 dated Nov. 7, 2019 (9 pp).

\* cited by examiner

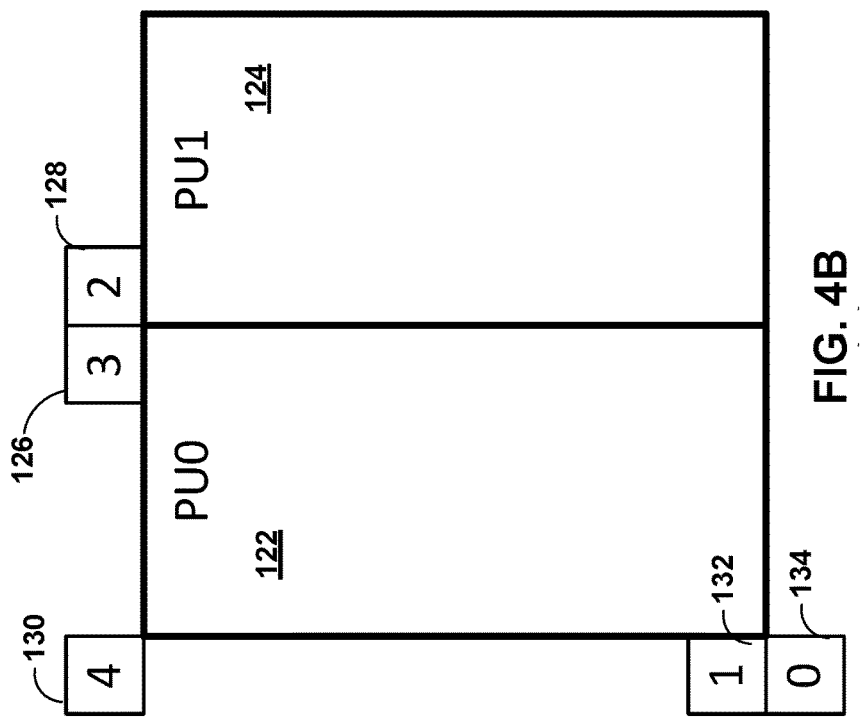
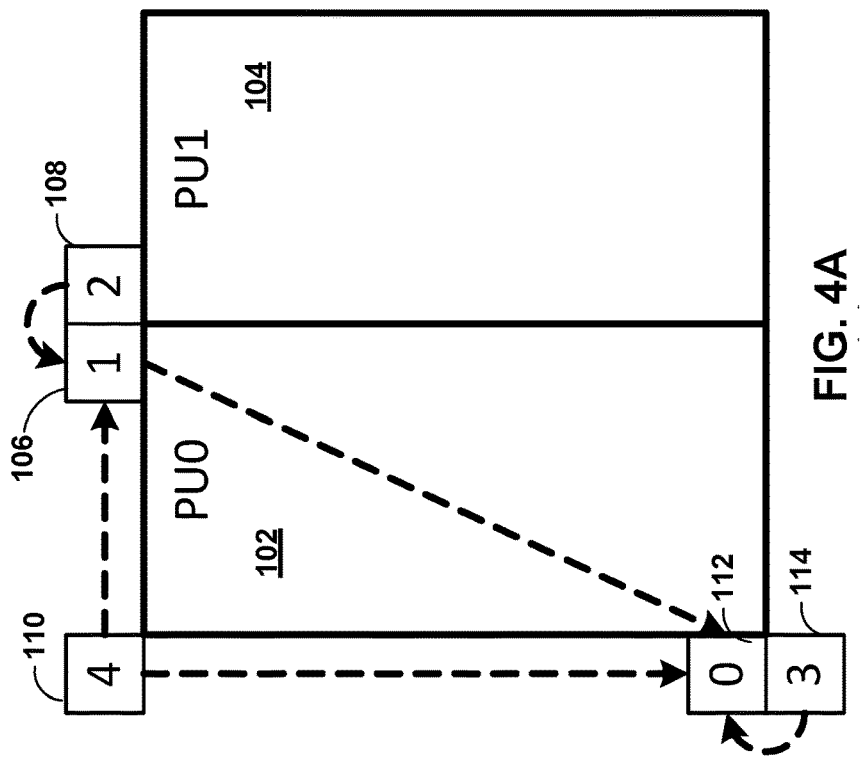
FIG. 4B
FIG. 4A the benefit of U.S. Provisional# GRADIENT BASED MATCHING FOR MOTION SEARCH AND DERIVATION This Application claims the benefit of U.S. Provisional Patent Application 62/491,744, filed on Apr. 28, 2017, the entire content of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which for some techniques may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to decoder-side motion vector derivation (DMVD). These techniques of this disclosure may be applied to any of the existing video codecs, such as HEVC (High Efficiency Video Coding), and/or may be an efficient coding tool in any future video coding standards. More particularly, this disclosure describes techniques related to refining a bi-predicted motion vector (MV) predictor using gradient information.

In one example, a method of decoding video data includes determining, by a video decoder implemented in circuitry, a bi-predicted MV predictor for a block of video data. The bi-predicted MV predictor indicates a first input reference block and a second input reference block. The method further includes refining, by the video decoder, the bi-predicted MV predictor using gradient information to determine a refined bi-predicted MV predictor indicating a first refined reference block that is within a search range from the first input reference block and a second refined reference block that is within the search range from the second input reference block, generating, by the video decoder, a predictive block for the block of video data based on the refined bi-predicted MV predictor, and decoding, by the video decoder, the block of video data based on the predictive block.

In another example, a device for decoding video data includes a memory configured to store the video data and one or more processors. The one or more processors are configured to determine a bi-predicted MV predictor for a block of video data. The bi-predicted MV predictor indicating a first input reference block and a second input reference block. The one or more processors are further configured to refine the bi-predicted MV predictor using gradient information to determine a refined bi-predicted MV predictor indicating a first refined reference block that is within a search range from the first input reference block and a second refined reference block that is within the search range from the second input reference block, generate a predictive block for the block of video data based on the first refined reference block and the second refined reference block, and generate the block of video data based on the predictive block.

In another example, a non-transitory computer-readable computer readable medium is configured with one or more instructions that, when executed, cause one or more processors to determine a bi-predicted MV predictor for a block of video data. The bi-predicted MV predictor indicating a first input reference block and a second input reference block. The one or more instructions further cause the one or more processors to refine the bi-predicted MV predictor using gradient information to determine a refined bi-predicted MV predictor indicating a first refined reference block that is within a search range from the first input reference block and a second refined reference block that is within the search range from the second input reference block, generate a predictive block for the block of video data based on the first refined reference block and the second refined reference block, and generate the block of video data based on the predictive block.

In another example, a device comprises means for determining a bi-predicted MV predictor for a block of video data. The bi-predicted MV predictor indicates a first input reference block and a second input reference block. The device further includes means for refining the bi-predicted MV predictor using gradient information to determine a refined bi-predicted MV predictor indicating a first refined reference block that is within a search range from the first input reference block and a second refined reference block that is within the search range from the second input reference block, means for generating a predictive block for the block of video data based on the refined bi-predicted MV predictor, and means for decoding the block of video data based on the predictive block.

In another example, a method of encoding video data includes determining, by a video encoder implemented in circuitry, a bi-predicted MV predictor for a block of video data. The bi-predicted MV predictor indicating a first input reference block and a second input reference block. The method further includes refining, by the video encoder, the bi-predicted MV predictor using gradient information to determine a refined bi-predicted MV predictor indicating a first refined reference block that is within a search range from the first input reference block and a second refined reference block that is within the search range from the second input reference block, generating, by the video encoder, a predictive block for the block of video data based on the first refined reference block and the second refined reference block, and generating, by the video encoder, a residual block using the predictive block.

In another example, a device for encoding video data includes a memory configured to store the video data and one or more processors. The one or more processors are configured to determine a bi-predicted MV predictor for a block of video data. The bi-predicted MV predictor indicating a first input reference block and a second input reference block. The one or more processors are configured to refine the bi-predicted MV predictor using gradient information to determine a refined bi-predicted MV predictor indicating a first refined reference block that is within a search range from the first input reference block and a second refined reference block that is within the search range from the second input reference block, generate a predictive block for the block of video data based on the first refined reference block and the second refined reference block, and generate a residual block using the predictive block.

In another example, a non-transitory computer-readable computer readable medium is configured with one or more instructions that, when executed, cause one or more processors to determine a bi-predicted MV predictor for a block of video data. The bi-predicted MV predictor indicating a first input reference block and a second input reference block. The one or more instructions further cause the one or more processors to refine the bi-predicted MV predictor using gradient information to determine a refined bi-predicted MV predictor indicating a first refined reference block that is within a search range from the first input reference block and a second refined reference block that is within the search range from the second input reference block, generate a predictive block for the block of video data based on the first refined reference block and the second refined reference block, and generate a residual block using the predictive block In another example, a device comprises means for determining a bi-predicted MV predictor for a block of video data. The bi-predicted MV predictor indicating a first input reference block and a second input reference block. The device further includes means for refining the bi-predicted MV predictor using gradient information to determine a refined bi-predicted MV predictor indicating a first refined reference block that is within a search range from the first input reference block and a second refined reference block that is within the search range from the second input reference block, means for generating a predictive block for the block of video data based on the first refined reference block and the second refined reference block, and means for generating a residual block using the predictive block.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIGS. 4A and 4B are conceptual diagrams illustrating example spatial neighboring motion vector candidates for a merge mode and an advanced motion vector prediction (AMVP) mode.

DETAILED DESCRIPTION

In general, the techniques of this disclosure relate to decoder-side motion vector derivation (DMVD). That is, rather than explicitly signaling a motion vector or other motion information, a video decoder may derive the motion vector according to any or all of the techniques of this disclosure, alone or in any combination.

In general, a video decoder may derive motion information for a current block of video data (e.g., a block currently being decoded). To derive the motion information, the video decoder may first determine a motion vector (MV) predictor for the current block. The MV predictor generally corresponds to pixel data obtained from one or more groups/blocks of previously decoded pixels. The MV predictor may be, for example, determined according to bilateral template matching.

In some examples, the video decoder may calculate a matching cost between a first input reference block and a second input reference block identified by the MV predictor. The video decoder may calculate the matching cost by applying respective weight values to cost measurements for corresponding pixels of the reference blocks, e.g., a first weight for a first cost measurement and a second weight for a second cost measurement, where the weights and cost measurements may be different from each other. The video decoder may then refine the motion information based on the matching cost using gradient information. Gradient information may include, for example, a first pixel gradient (e.g., a rate of change in a pixel value along a horizontal and/or a vertical direction) for the first input reference block and a second pixel gradient for the second input reference block.

Figure 1:
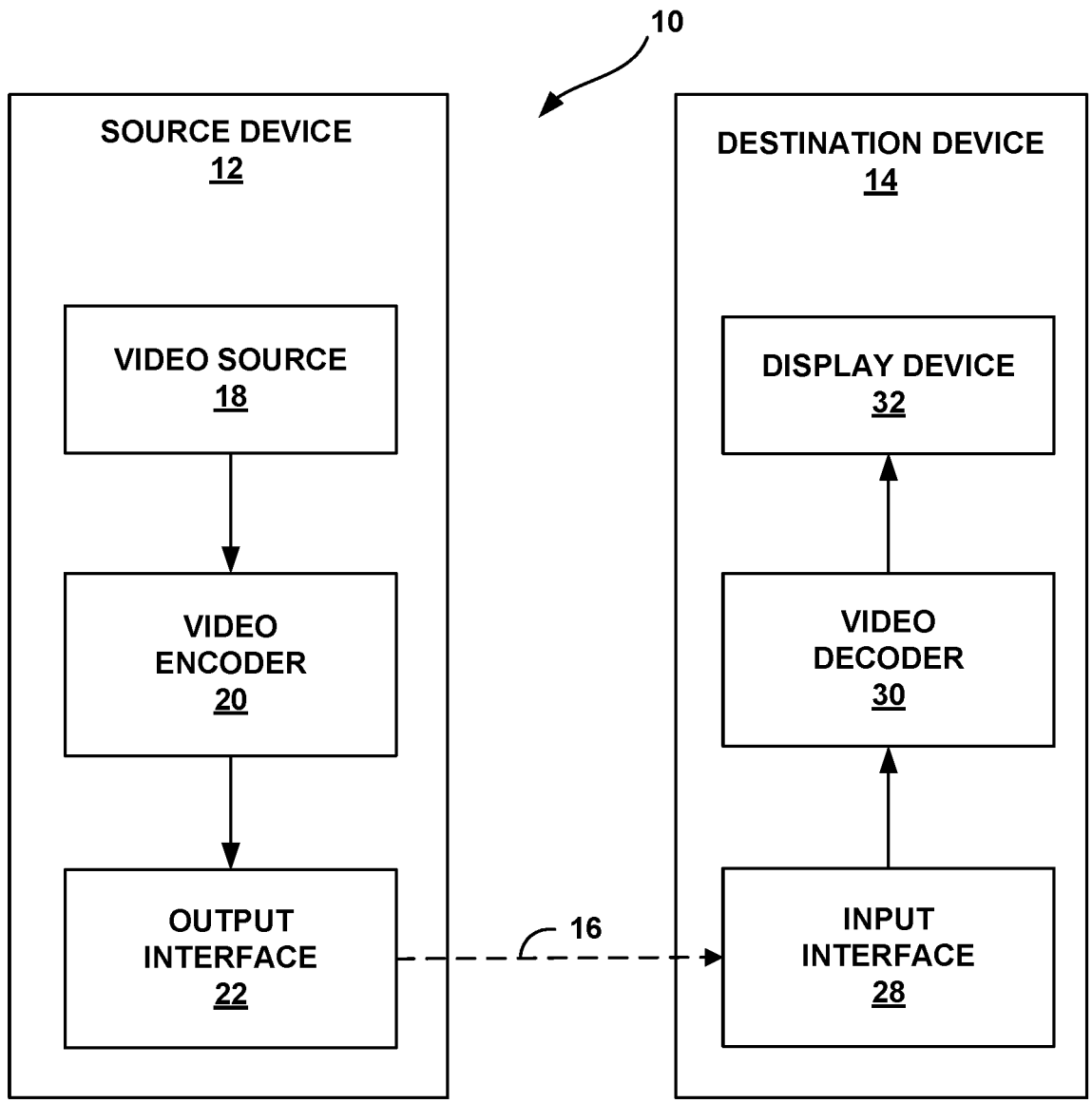
FIG. 1 is a block diagram illustrating an example video encoding and decoding system that may be configured to implement the techniques of this disclosure.

FIG. 1 is a block diagram illustrating an example video encoding and decoding system 10 that may utilize techniques for motion vector derivation and refinement. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector derivation and refinement. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for motion vector derivation and refinement may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

This disclosure is related to matching techniques used to search or derive motion information at both an encoder and a decoder (e.g., video encoder 20 and/or video decoder). The techniques of this disclosure may be applied to current and/or future video coding standards. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

Video encoder 20 and video decoder 30 may operate according to a video coding standard. Example video coding standards developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG) include High Efficiency Video Coding (HEVC) or ITU-T H.265, including its range extension, multiview extension (MV-HEVC) and scalable extension (SHVC). The finalized HEVC standard document is published as "ITU-T H.265, SERIES H: AUDIOVISUAL AND MULTIMEDIA SYSTEMS Infrastructure of audiovisual services—Coding of moving video—High efficiency video coding," Telecommunication Standardization Sector of International Telecommunication Union (ITU), April 2013. Alternatively, video encoder 20 and video decoder 30 may operate according to other proprietary or industry standards, such as ISO/IEC MPEG-4 Visual and ITU-T H.264 (also known as ISO/IEC MPEG-4 AVC), including its SVC extension and MVC extension. The techniques of this disclosure, however, are not limited to any particular coding standard. For example, the techniques of this disclosure may be used with a variety of other proprietary or non-proprietary video coding techniques or subsequent standards, such as ITU-T H.266.

In the HEVC standard, there are two inter prediction modes, named merge (skip is considered as a special case of merge) and advanced motion vector prediction (AMVP) modes respectively for a prediction unit (PU).

In either AMVP or merge mode, a MV candidate list is maintained for multiple motion vector predictors. The motion vector(s), as well as reference indices in the merge mode, of the current PU are generated by taking one candidate from the MV candidate list.

The MV candidate list may include up to 5 candidates for the merge mode and only two candidates for the AMVP mode. A merge candidate may include a set of motion information, e.g., motion vectors corresponding to both reference picture lists (e.g., list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, a motion vector difference (MVD) between a determined motion vector and a candidate motion vector may also be signaled. In AMVP mode, the predicted motion vectors can be further refined.

A merge candidate may correspond to a full set of motion information while an AMVP candidate may include just one motion vector for a specific prediction direction and reference index. The candidates for both modes are derived similarly from the same spatial and temporal neighboring blocks.

For inter-prediction modes, video encoder 20 may search for a block similar to the one being encoded (a "current block") in a picture of another temporal location, referred to as a reference picture. The information used to identify the reference picture may be referred to as motion information. For example, for each block, a set of motion information can be available. A set of motion information contains motion information for forward and backward prediction directions. Here forward and backward prediction directions are two prediction directions of a bidirectional prediction mode and the terms "forward" and "backward" do not necessarily have a geometry meaning, instead they correspond to reference picture list 0 (RefPicList0) and reference picture list 1 (RefPicList1) of a current picture. When only one reference picture list is available for a picture or slice, only RefPicList0 is available and the motion information of each block of a slice is always forward.

In some cases, a motion vector together with its reference index (e.g., a syntax element that indicates the reference picture) is used in decoding processes, such a motion vector with the associated reference index is denoted as a uni-predictive set of motion information.

For each prediction direction, the motion information contains a reference index and a motion vector. In some cases, for simplicity, a motion vector itself may be referred in a way that the motion vector is assumed that the motion vector has an associated reference index. A reference index is used to identify a reference picture in the current reference picture list (RefPicList0 or RefPicList1). A motion vector has a horizontal and a vertical component.

In HEVC, to generate an encoded representation of a picture, video encoder 20 may generate a set of coding tree units (CTUs). Each of the CTUs may comprise a coding tree block (CTB) of luma samples, two corresponding CTBs of chroma samples, and syntax structures used to code the samples of the CTBs. In monochrome pictures or pictures having three separate color planes, a CTU may comprise a single CTB block and syntax structures used to code the samples of the coding tree block.

A coding tree block may be an N×N block of samples. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs. A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU. When a CU is inter coded, the CU may be further partitioned into two or four PUs. When two PUs are present in one CU, the PUs may in some instances be half size rectangles or two rectangle size with one-fourth or three-quarters size of the CU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

A quadtree plus binary tree (QTBT) partition structure is being studied by the Joint Video Exploration Team (JVET). In J. An et al., "Block partitioning structure for next generation video coding", International Telecommunication Union, COM16-C966, September 2015 (hereinafter, "VCEG proposal COM16-C966"), QTBT partitioning techniques were described for future video coding standard beyond HEVC. Simulations have shown that the proposed QTBT structure may be more efficient than the quadtree structure used in HEVC.

In the QTBT structure described in VCEG proposal COM16-C966, a CTB is first partitioned using quadtree partitioning techniques, where the quadtree splitting of one node can be iterated until the node reaches the minimum allowed quadtree leaf node size. The minimum allowed quadtree leaf node size may be indicated to video decoder 30 by the value of the syntax element MinQTSize. If the quadtree leaf node size is not larger than the maximum allowed binary tree root node size (e.g., as denoted by a syntax element MaxBTSize), the quadtree leaf node can be further partitioned using binary tree partitioning. The binary tree partitioning of one node can be iterated until the node reaches the minimum allowed binary tree leaf node size (e.g., as denoted by a syntax element MinBTSize) or the maximum allowed binary tree depth (e.g., as denoted by a syntax element MaxBTDepth). VCEG proposal COM16-C966 uses the term "CU" to refer to binary-tree leaf nodes. In VCEG proposal COM16-C966, CUs are used for prediction (e.g., intra prediction, inter prediction, etc.) and transform without any further partitioning. In general, according to QTBT techniques, there are two splitting types for binary tree splitting: symmetric horizontal splitting and symmetric vertical splitting. In each case, a block is split by dividing the block down the middle, either horizontally or vertically. This differs from quadtree partitioning, which divides a block into four blocks.

In one example of the QTBT partitioning structure, the CTU size is set as 128×128 (e.g., a 128×128 luma block and two corresponding 64×64 chroma blocks), the MinQTSize is set as 16×16, the MaxBTSize is set as 64×64, the MinBT-Size (for both width and height) is set as 4, and the MaxBTDepth is set as 4. Quadtree partitioning is applied to the CTU first to generate quadtree leaf nodes. The quadtree leaf nodes may have a size from 16×16 (i.e., the MinQTSize is 16×16) to 128×128 (i.e., the CTU size). According to one example of QTBT partitioning, if the leaf quadtree node is 128×128, the leaf quadtree node cannot be further split by the binary tree, since the size of the leaf quadtree node exceeds the MaxBTSize (i.e., 64×64). Otherwise, the leaf quadtree node is further partitioned by the binary tree. Therefore, the quadtree leaf node is also the root node for the binary tree and has the binary tree depth as 0. The binary tree depth reaching MaxBTDepth (e.g., 4) implies that there is no further splitting. The binary tree node having a width equal to the MinBTSize (e.g., 4) implies that there is no further horizontal splitting. Similarly, the binary tree node having a height equal to MinBTSize implies no further vertical splitting. The leaf nodes of the binary tree (CUs) are further processed (e.g., by performing a prediction process and a transform process) without any further partitioning.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RB SP) interspersed as necessary with emulation prevention bits. Each of the NAL units includes a NAL unit header and encapsulates a RB SP.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RB SP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In accordance with the techniques of this disclosure, when a CU is inter coded, one set of motion information is present for each PU. In addition, each PU is coded with a unique inter-prediction mode to derive a set of motion information. Again, in the HEVC standard, there are two inter prediction modes, named merge (skip is considered as a special case of merge) and AMVP modes respectively for a PU.

A video coder, such as video encoder 20 and video decoder 30, may perform DMVD to derive motion information for a current block of video data. Generally, DMVD is directed to deriving motion information, such as motion vectors and prediction directions, using previously decoded information. The motion information generally corresponds to pixel data obtained from one or more groups/blocks of previously decoded pixels. For example, video encoder 20 and/or video decoder 30 may determine a bi-predicted MV predictor. In some examples, the bi-predicted MV predictor includes a merge predictor. In some examples, the bi-predicted MV predictor includes a AMVP predictor.

Video encoder 20 and/or video decoder 30 may refine motion information for a current block of video data. For example, in frame-rate up-conversion (FRUC) template matching, the video coder (e.g., video encoder 20 or video decoder 30) may refine the MV predictor using templates of the current block and the reference blocks.

Video encoder 20 and/or video decoder 30 may calculate a matching cost (e.g., a difference) between a first reference block and a second reference block identified by derived motion information for the current block. Video encoder 20 and/or video decoder 30 may calculate the matching cost by using gradient information. Gradient information may include to a color (e.g., Y, Cr, Cb, etc.) gradient (e.g., a horizontal component and/or a vertical component) of a reference block. Video encoder 20 and/or video decoder 30 may then refine the motion information based on the matching cost.

Video encoder 20 and/or video decoder 30 may iteratively refine the motion information. For example, after a refined MV predictor is derived, the video coder may regenerate a bilateral template using a refined MV predictor. In this example, video encoder 20 and/or video decoder 30 may perform another MV predictor refinement and the MV predictor refinement iteration may be repeated until some predefined criterion (e.g., a number of iterations) is reached. In some examples, the number of iterations may be fixed and pre-defined for both video encoder 20 and video decoder 30. For example, the MV predictor refinement may be iterated for N times (N is fixed and pre-defined) and for each iteration the motion information is refined according to the results of previous iterations. In another example, the video coder may terminate the iterations when the matching cost is smaller than (or equal to) a pre-defined threshold. In some examples, the video coder may terminate the iterations when the matching cost is smaller than (or equal to) a pre-defined threshold or the iteration number reaches a pre-defined number.

In order to generate reference data, video encoder 20 decodes encoded video data and stores the decoded video data in a decoded picture buffer (DPB), e.g., a portion of memory of video encoder 20. Thus, video encoder 20 may use the data of the DPB for reference when predictively encoding subsequent video data. Because video encoder 20 includes elements for decoding encoded video data, video encoder 20 may be said to include a video decoder.

Figure 2:
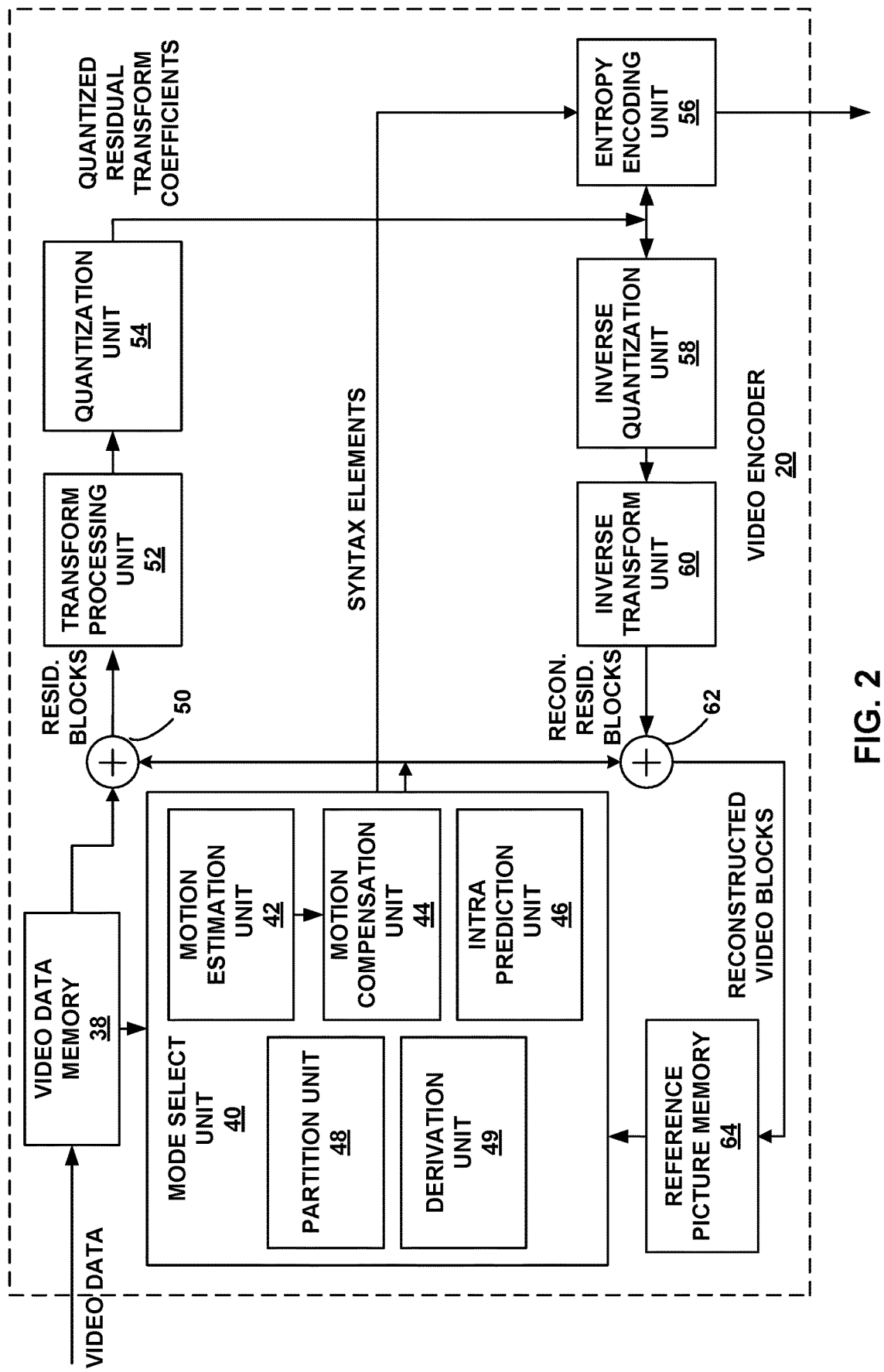
FIG. 2 is a block diagram illustrating an example of video encoder that may be configured to implement the techniques of this disclosure.

FIG. 2 is a block diagram illustrating an example of video encoder 20 that may implement techniques for motion vector derivation and refinement. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes video data memory 38, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Video data memory 38 may store the video data to be encoded by the components of video encoder 20. The video data stored in video data memory 38 may be obtained, for example, from video source 18. Reference picture memory 64 may be referred to as a DPB that stores reference video data for use in encoding video data by video encoder 20, e.g., in intra- or inter-coding modes. Video data memory 38 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 38 and reference picture memory 64 may be provided by the same memory device or separate memory devices. In various examples, video data memory 38 may be on-chip with other components of video encoder 20, or off-chip relative to those components.

Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit).

A predictive block is a block that is found to closely match the block to be coded, in terms of pixel difference, which may be determined by sum of absolute difference (SAD), sum of square difference (SSD), or other difference metrics.

In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. When a motion vector is to be signaled, motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 may be configured to perform any combination of the techniques described herein for deriving motion information, performing block partitioning, and/or interpolating video data. In particular, certain techniques of this disclosure may be performed by derivation unit 49. Derivation unit 49 may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof.

Derivation unit 49 may be configured to determine motion information for a current block without including data indicating the motion information in the bitstream. For example, derivation unit 49 may determine a bi-predicted MV predictor for a block of video data. The bi-predicted MV predictor may indicate a first input reference block and a second input reference block. Derivation unit 49 may refine the bi-predicted MV predictor using gradient information to determine a refined bi-predicted MV predictor indicating a first refined reference block that is within a search range from the first input reference block and a second refined reference block that is within the search range from the second input reference block. Motion compensation unit 44 may generate a predictive block for the block of video data based on the first refined reference block and the second refined reference block. In this example, summer 50 may generate a residual block using the predictive block.

Derivation unit 49 (and/or mode select unit 40) may determine whether to perform motion derivation for a particular block (e.g., versus intra-prediction or traditional inter-prediction) based on a rate distortion analysis. For example, derivation unit 49 may determine whether to perform motion derivation in a manner similar to a rate distortion cost selection as is performed for merge candidates in merge mode. In this example, derivation unit 49 may check each motion information derivation mode of a plurality of motion information derivation modes (e.g., a bilateral matching mode, template matching mode, or the like) using a rate distortion cost selection.

Derivation unit 49 may further compare the motion information derivation mode having the minimal cost to other PU modes (e.g., intra-prediction modes, a traditional inter-prediction mode, a palette coding mode, or the like). In instances in which the motion derivation mode is the most efficient mode in terms of coding efficiency, video encoder 20 may encode one or more syntax elements indicating that motion information is derived (rather than signaled) for the current block. Video encoder 20 may also encode one or more syntax elements to indication the motion derivation mode from a plurality of motion information derivation modes.

Derivation unit 49 may interpolate video data that is not included in the encoded bitstream for a video sequence. For example, derivation unit 49 may perform any combination of motion derivation techniques to interpolate a picture that is not included in the bitstream, e.g., similar to frame rate up-conversion. In some instances, video encoder 20 may use the interpolated picture during encoding. For example, derivation unit 49 may interpolate a picture and video encoder 20 may encode data for a current picture relative to the interpolated picture. In this example, video encoder 20 may add the interpolated picture to reference picture memory 64 and encode data of other pictures based on at least a portion of the interpolated picture.

Derivation unit 49 may interpolate a picture and video encoder 20 may set the interpolated picture equal to the current picture. For example, derivation unit 49 may interpolate the current picture and video encoder 20 may encode syntax data for the current picture to be included in the bitstream (e.g., slice header data and the like), but may skip the encoding of video data for the current picture.

While derivation unit 49 may be configured to perform certain derivation and/or interpolation techniques, as described herein, it should be understood that one or more other units of video encoder 20 may also or alternatively be configured to interpolate data. For example, video encoder 20 may include a variety of other interpolators or filters, e.g., for interpolating a pixel at a sub-pixel (sub-pel) location during motion compensation.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 3:
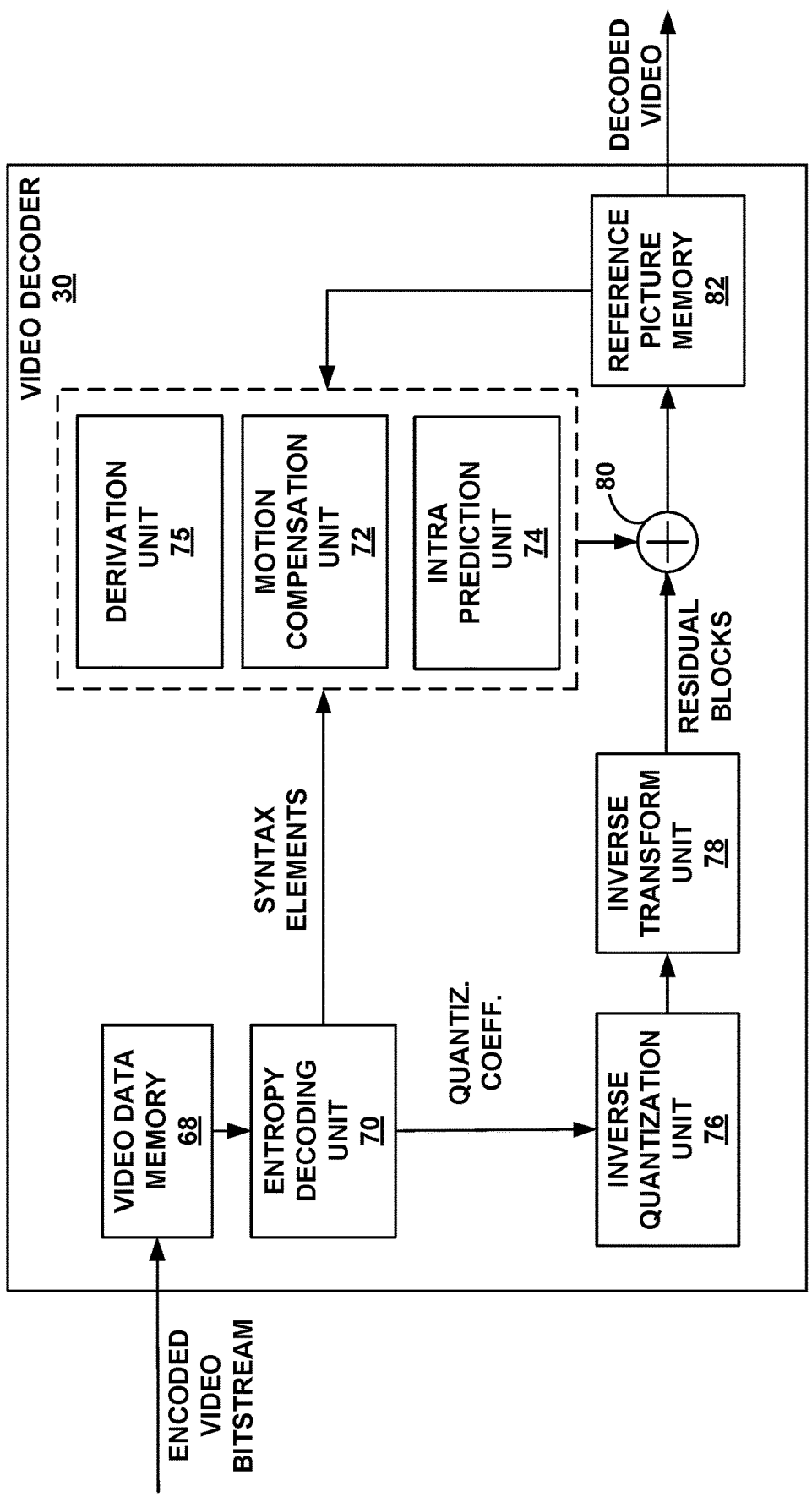
FIG. 3 is a block diagram illustrating an example of video decoder that may be configured to implement the techniques of this disclosure.

FIG. 3 is a block diagram illustrating an example of video decoder 30 that may implement techniques for motion vector derivation and refinement. In the example of FIG. 3, video decoder 30 includes video data memory 68, an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. The video data stored in video data memory 68 may be obtained, for example, from computer-readable medium, e.g., from a local video source, such as a camera, via wired or wireless network communication of video data, or by accessing physical data storage media. Video data memory 68 may form a coded picture buffer (CPB) that stores encoded video data from an encoded video bitstream.

Reference picture memory 82 may be referred to as a DPB that stores reference video data for use in decoding video data by video decoder 30, e.g., in intra- or inter-coding modes. Video data memory 68 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 68 and reference picture memory 82 may be provided by the same memory device or separate memory devices. In various examples, video data memory 68 may be on-chip with other components of video decoder 30, or off-chip relative to those components.

Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or generalized PB (GPB)) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by syntax elements, and uses prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

According to aspects of this disclosure, video decoder 30 may be configured to perform any combination of the techniques described herein for deriving motion information, performing block partitioning, and/or interpolating video data. In particular, certain techniques of this disclosure may be performed by derivation unit 75. Derivation unit 75 may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof.

Derivation unit 75 may be configured to determine motion information for a current block without decoding the motion information from an encoded bitstream. For example, derivation unit 75 may determine a bi-predicted MV predictor for a block of video data. The bi-predicted MV predictor may indicate a first input reference block and a second input reference block. Derivation unit 75 may refine the bi-predicted MV predictor using gradient information to determine a refined bi-predicted MV predictor indicating a first refined reference block that is within a search range from the first input reference block and a second refined reference block that is within the search range from the second input reference block. Motion compensation unit 72 may generate a predictive block for the block of video data based on the first refined reference block and the second refined reference block. In this example, video decoder 30 may decode the block of video data based on the predictive block. For instance, video decoder 30 forms a decoded video block by summing residual blocks from inverse transform unit 78 with the corresponding predictive blocks generated by motion compensation unit 72. Summer 80 represents the component or components that perform this summation operation.

Derivation unit 75 may determine whether to perform motion derivation for a particular block (e.g., versus intra-prediction or traditional inter-prediction). For example, video decoder 30 may decode one or more syntax elements indicating that motion information is derived (rather than signaled) for a block being decoded. Video decoder 30 may also decode one or more syntax elements that indicate one motion information derivation mode from a plurality of motion information derivation modes to be used for decoding a block. Derivation unit 75 may determine whether to perform motion derivation and the motion information derivation mode for a block based on the decoded syntax. In some examples, as described herein, the syntax may be associated with one or more other modes, such as merge mode, AMVP, or other decoding functions.

According to other aspects of this disclosure, derivation unit 75 may interpolate video data that is not included in the encoded bitstream for a video sequence. For example, derivation unit 75 may perform any combination of motion derivation techniques to interpolate a picture that is not included in the parsed bitstream, e.g., similar to frame rate up-conversion. In some instances, video decoder 30 may use the interpolated picture during encoding. For example, derivation unit 75 may interpolate a picture and video decoder 30 may decode data for a current picture relative to the interpolated picture. In this example, video decoder 30 may add the interpolated picture to reference picture memory 82 and decode data of other pictures based on at least a portion of the interpolated picture.

Derivation unit 75 may interpolate a picture and video decoder 30 may set the interpolated picture equal to the current picture. For example, derivation unit 75 may interpolate the current picture and video decoder 30 may decode syntax elements for the current picture from the encoded bitstream (e.g., slice header data and the like), but may skip the decoded of video data for the current picture and instead interpolate the current picture.

While derivation unit 75 may be configured to perform certain interpolation techniques, as described herein, it should be understood that one or more other units of video decoder 30 may also or alternatively be configured to interpolate data. For example, video decoder 30 may include a variety of other interpolators or filters, e.g., for interpolating a pixel at a sub-pixel (sub-pel) location during motion compensation.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

FIGS. 4A and 4B are conceptual diagrams illustrating spatial neighboring candidates in HEVC. In some examples, video encoder 20 (e.g., derivation unit 49) and/or video decoder 30 (e.g., derivation unit 75) may derive spatial MV candidates from the neighboring blocks, e.g., as shown in FIGS. 4A and 4B, for a specific PU (e.g., PU0 102 of FIG. 4A and PU0 122 of FIG. 4B, which are included in the same corresponding CUs as PU1 104 and PU1 124, respectively), although the methods for generating the candidates from the blocks differ for merge and AMVP modes. In merge mode, video encoder 20 and/or video decoder 30 may derive up to four spatial MV candidates according to the order shown in FIG. 4A with numbers, as follows: left (block 112), above (block 106), above right (block 108), below left (block 114), and above left (block 110).

In AVMP mode, video encoder 20 and/or video decoder 30 divide the neighboring blocks into two groups: left group (including blocks 132 and 134), and above group (including blocks 130, 126, and 128), as shown in FIG. 4B. For each group, video encoder 20 and/or video decoder 30 determines the potential candidate in a neighboring block referring to the same reference picture as that indicated by the signaled reference index that has the highest priority to form a final candidate of the group. It is possible that no neighboring blocks contain a motion vector pointing to the same reference picture. Therefore, if such a candidate cannot be found, video encoder 20 and/or video decoder 30 may scale the first available candidate to form the final candidate, and thus, the temporal distance differences can be compensated.

Figure 5:
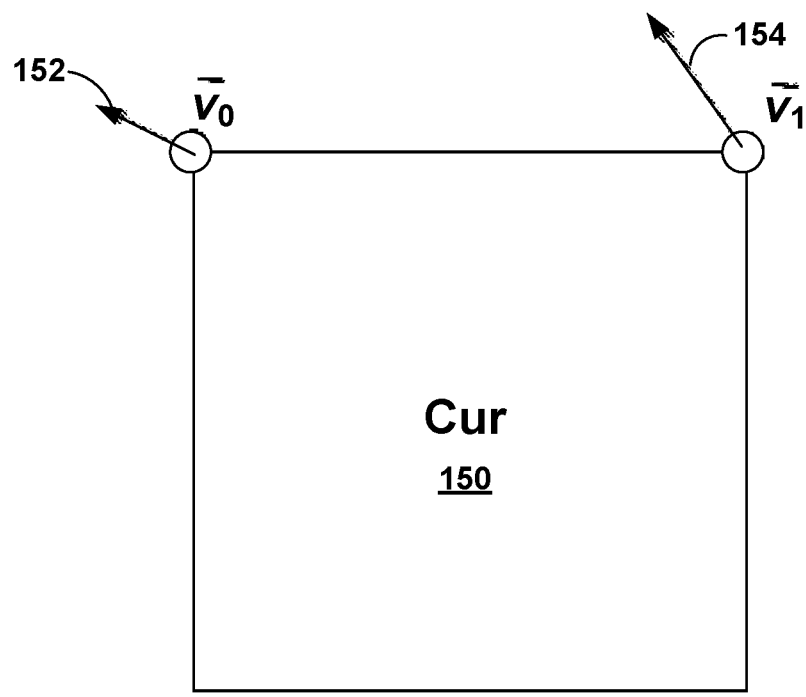
FIG. 5 is a conceptual diagram illustrating an example simplified affine motion model.

FIG. 5 is a conceptual diagram illustrating an example simplified affine motion model. In HEVC, only a translational motion model is applied for motion compensation prediction (MCP). While in the real world, there are many kinds of motions, e.g. a zoom in/out, rotation, perspective motions and the other irregular motions. When configured for JEM (Joint exploration model by ITU-T VCEG and MPEG), video encoder 20 and/or video decoder 30 may apply a simplified affine transform motion compensation prediction to improve the coding efficiency. As shown FIG. 5, the affine motion field of block 150 is described by two control point motion vectors $V_0$ 152 and $V_1$ 154.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

Where the set $v_{0x}$ and $v_{0y}$ are vertical and horizontal components, respectively, of the motion vector $V_0$ 152 of the top-left corner control point, and the set $v_{1x}$ and $v_{1y}$ are vertical and horizontal components, respectively, of the motion vector $V_1$ 154 of the top-right corner control point. In order to further simplify the motion compensation prediction, video encoder 20 and/or video decoder 30 may apply block based affine transform prediction.

Figure 6:
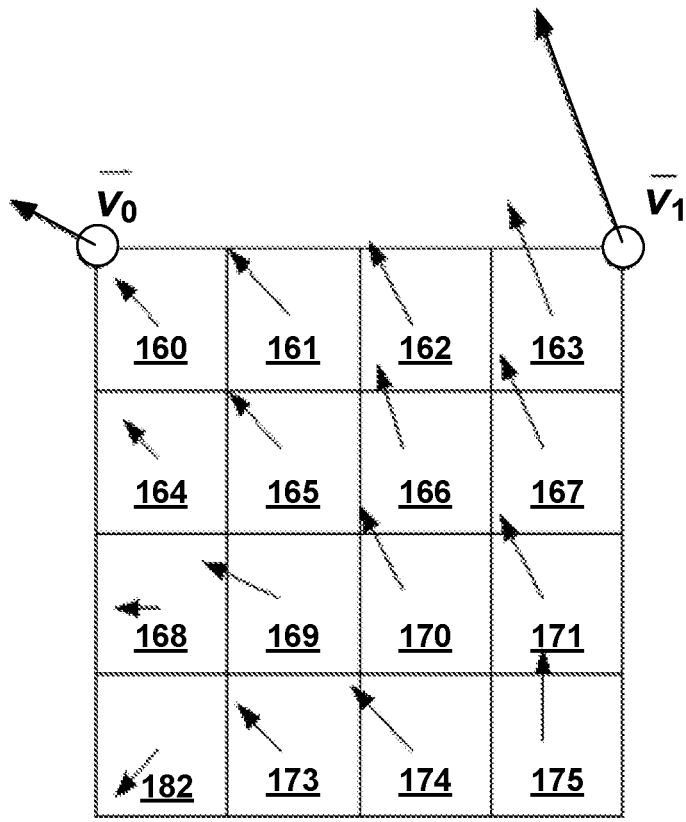
FIG. 6 is a conceptual diagram illustrating an example affine motion vector field (MVF) per sub-block.

FIG. 6 is a conceptual diagram illustrating an example affine MVF per sub-block. To derive motion vector of each 4×4 sub-block, video encoder 20 and/or video decoder 30 may calculate the motion vector of the center sample of each sub-block of sub-blocks 160-175, as shown in FIG. 6, according to equation (1), and rounded to ⅟16 fraction accuracy. In this example, video encoder 20 and/or video decoder 30 may apply motion compensation to generate the prediction of each sub-block of sub-blocks 160-175 with derived motion vector.

After MCP, video encoder 20 and/or video decoder 30 may round and save the high accuracy motion vector of each sub-block of sub-blocks 160-175 as the same accuracy as the normal motion vector.

Figure 7:
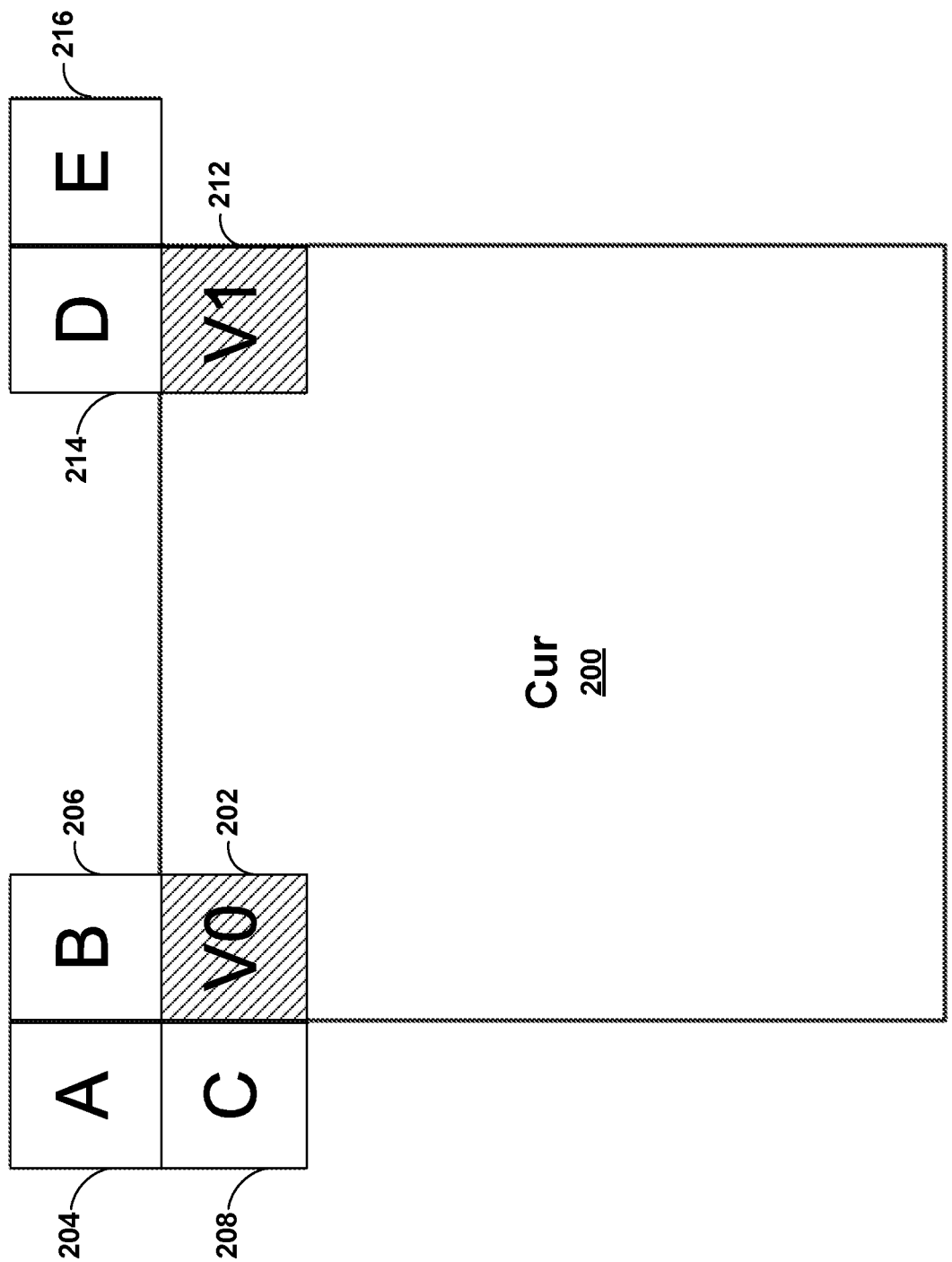
FIG. 7 is a conceptual diagram illustrating a motion vector prediction (MVP) for affine inter mode.

FIG. 7 is a conceptual diagram illustrating a motion vector prediction (MVP) for affine inter mode. In JEM, there are two affine motion modes: AF_INTER mode and AF_MERGE mode. For CUs with both width and height larger than 8, video encoder 20 and/or video decoder 30 may apply AF_INTER mode. Video encoder 20 may signal an affine flag in CU level in the bitstream to indicate whether AF_INTER mode is used. In this mode, video encoder 20 and/or video decoder 30 may construct a candidate list with motion vector pair $\{(v_0, v_1)|v_0=\{v_A, v_B, v_C\}, v_1=\{v_D, v_E\}\}$ using the neighbour blocks, where a $V_o$ is motion vector 202, $V_1$ is motion vector $V_1$ 212, $V_A$ is a motion vector for block A 204, $V_B$ is a motion vector for block B 206, $V_C$ is a motion vector for block C 208, $V_D$ is a motion vector for block D 214, and $V_E$ is a motion vector for block E 216.

As shown in FIG. 7, video encoder 20 and/or video decoder 30 may select $V_0$ 202 from the motion vectors of the block A 204, block B 206, or block C 208. Video encoder 20 and/or video decoder 30 may scale the motion vector $V_0$ 202 from the neighbour block according to the reference list and the relationship among the POC of the reference for the neighbour block, the POC of the reference for the current CU 200 and the POC of the current CU 200.

Similarly, video encoder 20 and/or video decoder 30 may select $V_1$ 212 from the neighbour block D 214 and neighboring block E 216. If the number of candidate list is smaller than 2, video encoder 20 and/or video decoder 30 may pad the list by the motion vector pair composed by duplicating each of the AMVP candidates. When the candidate list is larger than 2, video encoder 20 and/or video decoder 30 may sort the candidates according to the consistency of the neighbouring motion vectors (similarity of the two motion vectors in a pair candidate) and only keep the first two candidates. Video encoder 20 and/or video decoder 30 may use a rate-distortion (RD) cost check to determine which motion vector pair candidate is selected as the control point motion vector prediction (CPMVP) of the current CU. Video encoder 20 and/or video decoder 30 may signal an index indicating the position of the CPMVP in the candidate list in the bit stream. After the CPMVP of the current affine CU is determined, video encoder 20 and/or video decoder 30 may apply affine motion estimation and find the control point motion vector (CPMV). In this example, video encoder 20 and/or video decoder 30 may signal the difference of the CPMV and the CPMVP in the bit stream. Both CPMV and CPMVP may include two sets of translational motion vectors. Therefore, the signaling cost of affine motion information may be higher than that of signalling translational motion.

When video encoder 20 and/or video decoder 30 applies a CU in AF_MERGE mode, video encoder 20 and/or video decoder 30 codes the first block with affine mode from the valid neighbor reconstructed blocks.

Figure 8A:
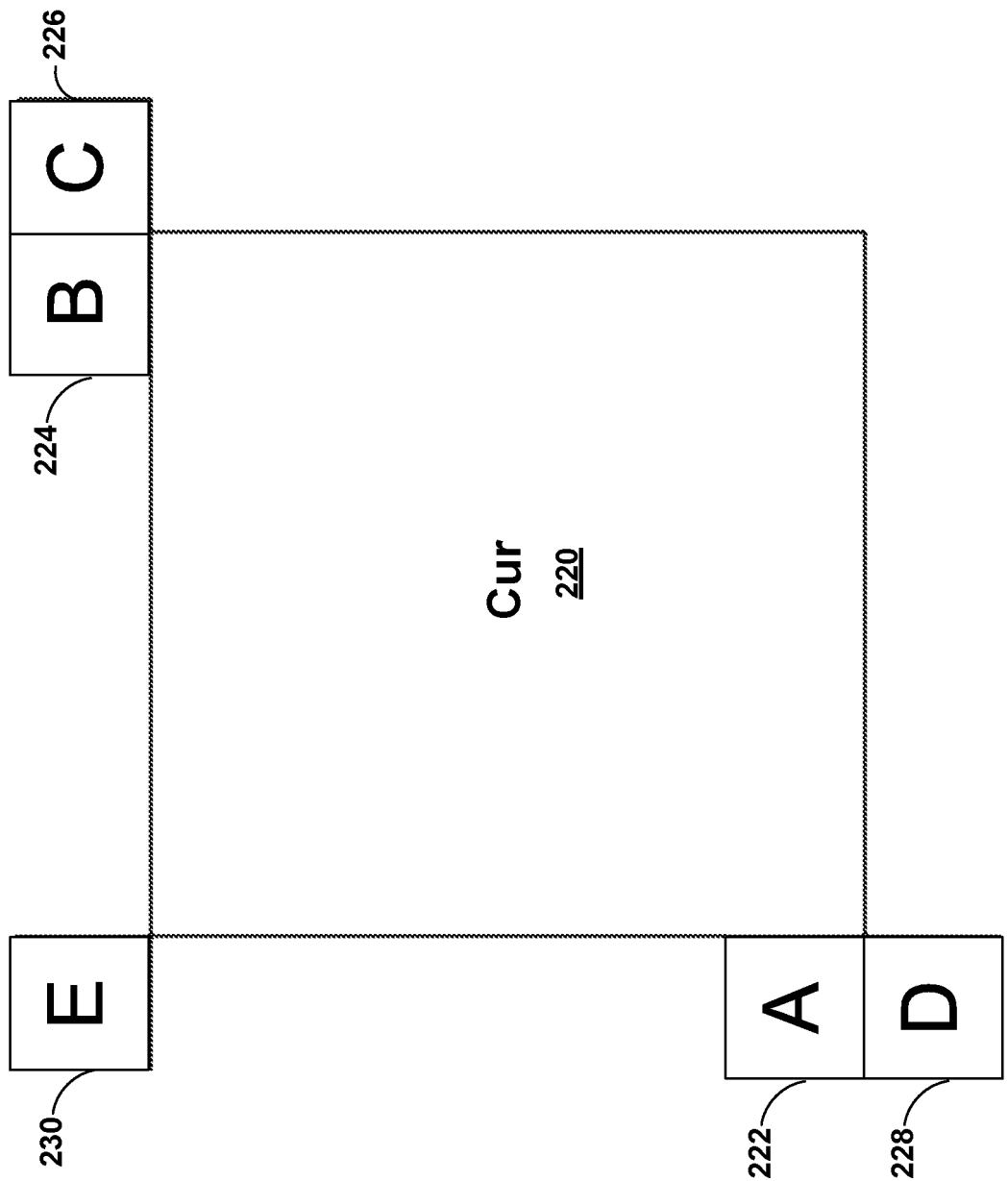
FIGS. 8A and 8B are a conceptual diagram illustrating a MVP for affine merge mode.
Figure 8B:
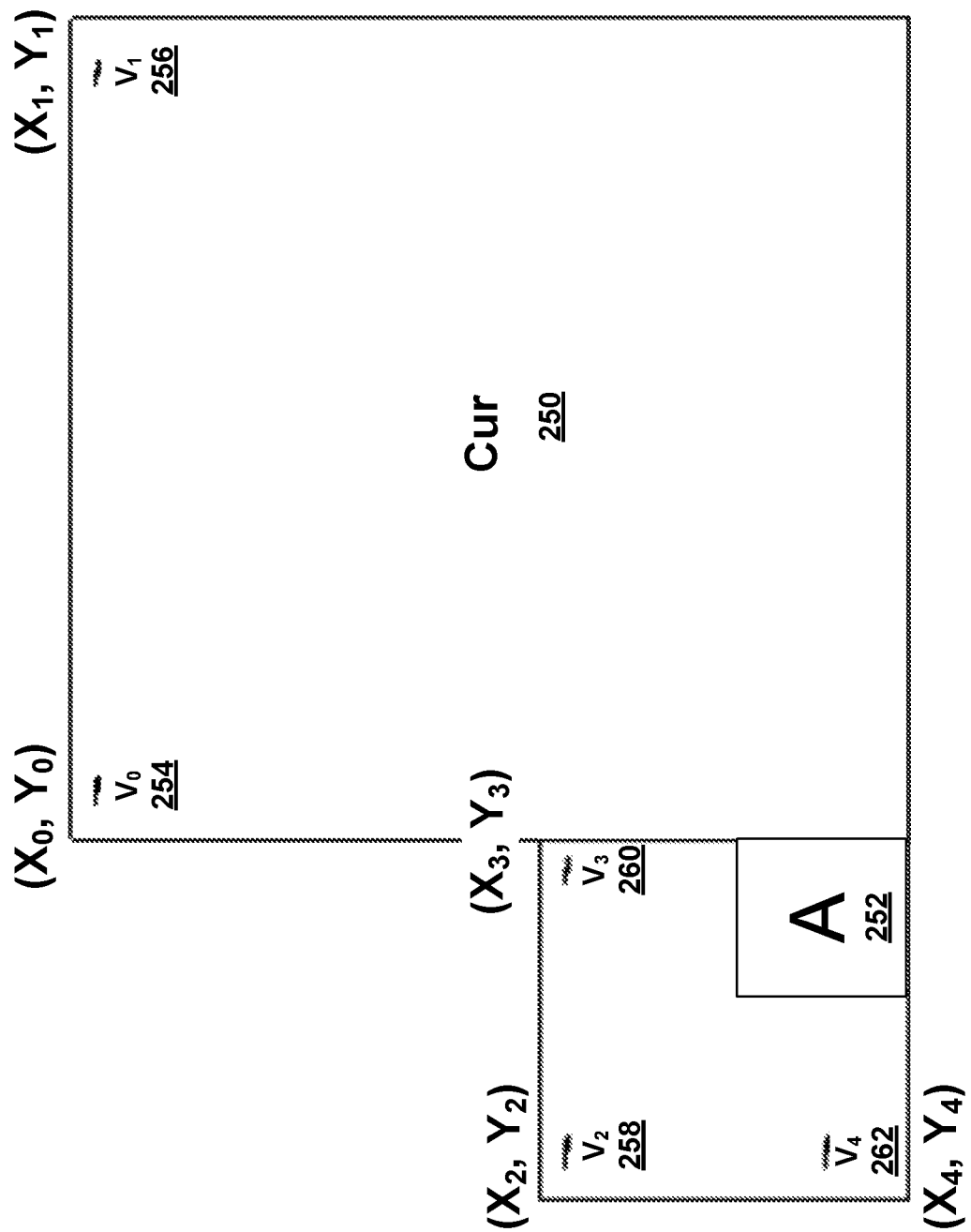

FIGS. 8A and 8B are a conceptual diagram illustrating a MVP for affine merge mode. Video encoder 20 and/or video decoder 30 may use a selection order for the candidate block 220 from left (e.g., block 222), above (e.g., block 224), above right (e.g., block 226), left bottom (e.g., block 228) to above left (e.g., block 230) as shown in FIG. 8A.

If video encoder 20 and/or video decoder 30 codes the neighbor left bottom block A 252 in affine mode as shown in FIG. 8B, video encoder 20 and/or video decoder 30 derives the motion vectors $V_2$ 258, $V_3$ 260 and $V_4$ 262 of the top left corner, above right corner and left bottom corner of the CU which contains block A 252. In this example, video encoder 20 and/or video decoder 30 calculates the motion vector $V_0$ 254 of the top left corner on the current CU 250 according to $V_2$ 258, $V_3$ 260 and $V_4$ 262. In this example, video encoder 20 and/or video decoder 30 calculates the motion vector $V_1$ 256 of the above right of the current CU 250.

After deriving the CPMV of current CU 250, video encoder 20 and/or video decoder 30 may derive $V_0$ 254 and $V_1$ 256, according to the simplified affine motion model equation (1). In this example, video encoder 20 and/or video decoder 30 generate the MVF of the current CU 250. In order to identify whether the current CU 250 is coded with AF_MERGE mode, video encoder 20 may signal an affine flag in the bit stream when there is at least one neighbor block is coded in affine mode.

In some examples, video encoder 20 and/or video decoder 30, using affine motion estimation, may find affine motion for a block at the encoder side by minimize the distortion between original block and affine motion predicted block. As affine motion has more parameters than translational motion, affine motion estimation may be more complicated than translational motion estimation. In L. Li, H. Li, Z. Lv and H. Yang, "An affine motion compensation framework for high efficiency video coding," 2015 IEEE International Symposium on Circuits and Systems (ISCAS), Lisbon, 2015, pp. 525-528, a fast affine motion estimation method based on Taylor expansion of signal was proposed.

Give a pixel value $I_t$ at time t, its first order Taylor expansion is $$I_t = I_{t0} + \frac{\partial I_{t0}}{\partial t}(t - t0) = I_{t0} + \frac{\partial I_{t0}}{\partial x} \cdot \frac{\partial x}{\partial t} \cdot (t - t_0) + \frac{\partial I_{t0}}{\partial y} \cdot \frac{\partial y}{\partial t} \cdot (t - t_0) \quad (2)$$

where $\partial I_{t0}/\partial x$ and $\partial I_{t0}/\partial y$ are the pixel gradient $G_{0x}$, $G_{0y}$ at x and y directions, respectively, while $$\frac{\partial x}{\partial t} \cdot (t - t_0) \text{ and } \frac{\partial y}{\partial t} \cdot (t - t_0)$$

indicate motion vector $V_x$ and $V_y$. Then (2) may be rewritten as (3)

$$I_t = I_{t0} + G_{x0} \cdot V_x + G_{y0} \cdot V_y \quad (3)$$

Accordingly, affine motion $V_x$ and $V_y$ can be solved by minimizing the distortion between prediction ($I_{t0}+G_{x0} \cdot V_x + G_{y0} \cdot V_y$) and original signal.

Taking 4-parameter affine model as an example, $$V_x = a \cdot x + b \cdot y + c \quad (4)$$

$$V_y = b \cdot x - a \cdot y + d \quad (5)$$

Taking (4) and (5) into (3) and then minimizing the distortion between original signal and prediction by (3) will lead to the solution of affine parameter a, b, c and d, i.e., $$\{a,b,c,d\} = \arg \min\{\Sigma(I_t - I_{t0} - G_{x0} \cdot (a \cdot x + b \cdot y + c) - G_{y0} \cdot (b \cdot x - a \cdot y + d))^2\} \quad (6)$$

Similarly, 6-parameter affine motion or other affine motion can be solved by this way.

Figure 9:
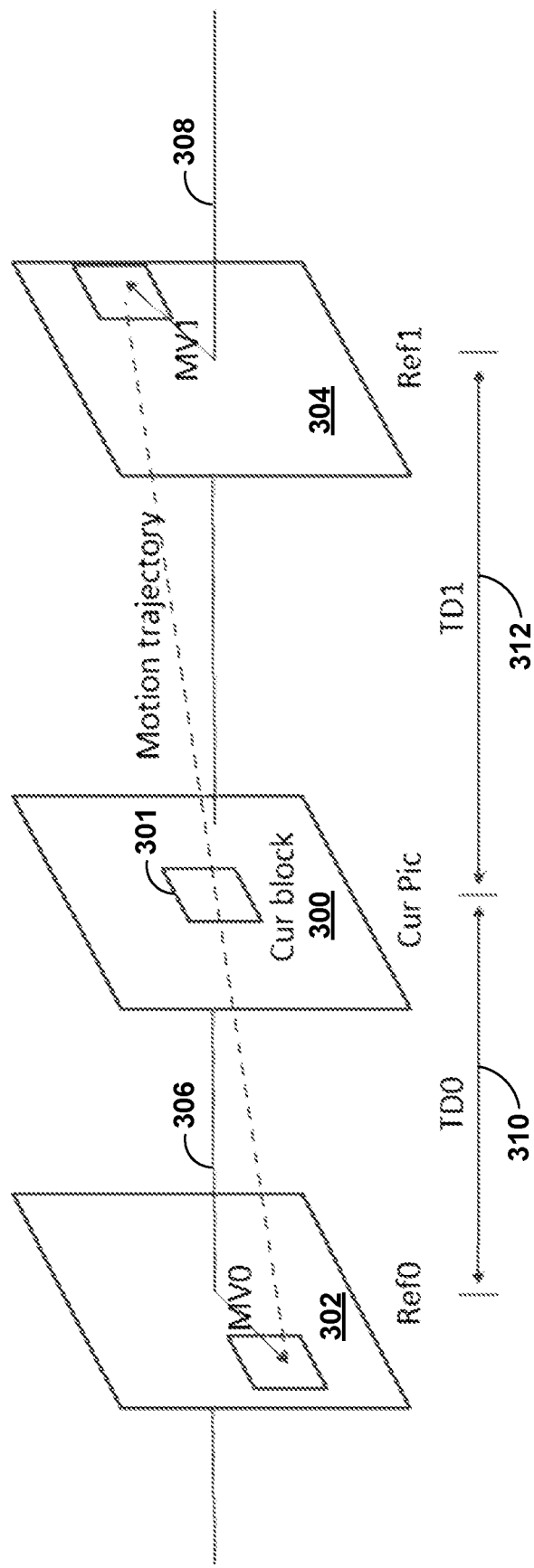
FIG. 9 is a conceptual diagram illustrating an example of bilateral matching.

FIG. 9 is a conceptual diagram illustrating an example of bilateral matching. In U.S. Patent Application Publication 2016/0286229, a coding method was proposed based on frame rate up-conversion method, e.g. FRUC mode. Generally, FRUC mode is a special merge mode, with which motion information of a block is not signaled but derived at decoder side.

Video encoder 20 may signal a FRUC flag for a CU when its merge flag is true. When the FRUC flag is false, video encoder 20 may signal a merge index and use the regular merge mode. When the FRUC flag is true, video encoder 20 may signal an additional FRUC mode flag to indicate which method (bilateral matching or template matching) is to be used to derive motion information for the block.

During the motion derivation process, video encoder 20 and/or video decoder 30 may derive an initial motion vector for the whole CU based on bilateral matching or template matching. In this example, video encoder 20 and/or video decoder 30 may check the merge list of the CU and selects the candidate which leads to the minimum matching cost as the starting point. In this example, video encoder 20 and/or video decoder 30 performs a local search based on bilateral matching or template matching around the starting point and takes the MV that results in the minimum matching cost as the MV for the whole CU. Subsequently, video encoder 20 and/or video decoder 30 may further refine the motion information at a sub-block level with the derived CU motion vectors as the starting points.

As shown in the FIG. 9, video encoder 20 and/or video decoder 30 may use bilateral matching to derive motion information of the current block 301 by finding the best match between two blocks along the motion trajectory of the current block in two different reference pictures. For example, video encoder 20 and/or video decoder 30 may find the best match between a first input reference block 302 of Ref0 and a second input reference block 304 along the motion trajectory of the current block 301.

Under the assumption of continuous motion trajectory, the motion vectors MV0 306 and MV1 308 pointing to the first input reference block 302 and the second input reference block 304, respectively, shall be proportional to the temporal distances, i.e., TD0 310 and TD1 312, between the current picture 300 and the first input reference block 302 and the second input reference block 304. As a special case, when the current picture 300 is temporally between the two reference pictures and the temporal distance from the current picture to the first input reference block 302 and the second input reference block 304 are the same, the bilateral matching becomes mirror based bi-directional MV.

Figure 10:
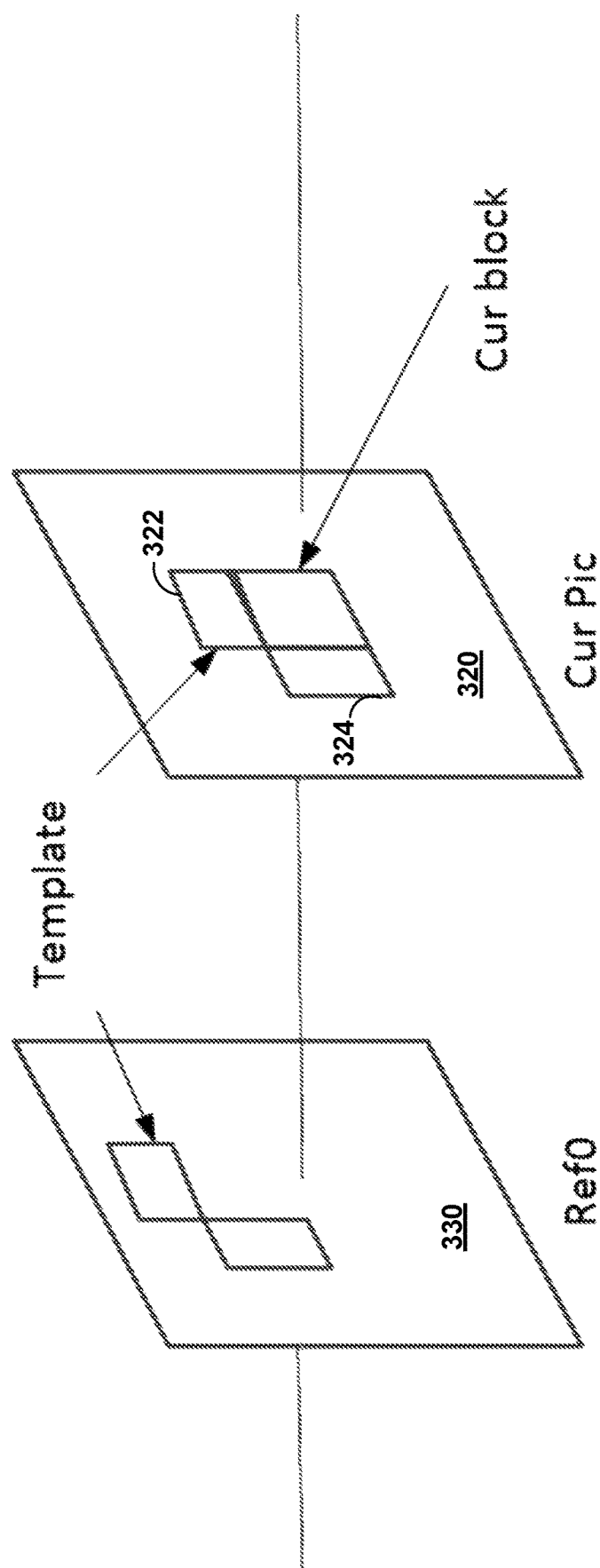
FIG. 10 is a conceptual diagram illustrating an example of template matching.

FIG. 10 is a conceptual diagram illustrating an example of template matching. In the example of FIG. 10, video encoder 20 and/or video decoder 30 may use template matching to derive motion information of current block 320 by finding the best match between a template (e.g., top neighbouring block 322 and/or left neighbouring block 324 of current block 320) in current picture 320 and a block (same size to the template) in a reference picture 330.

At the encoder side, video encoder 20 may make a decision on whether to use FRUC merge mode for a CU based on RD cost selection as done for normal merge candidate. That is, video encoder 20 may check the two matching modes (e.g., bilateral matching and template matching) for a CU by using RD cost selection. Video encoder 20 may compare the one leading to the minimal cost (e.g., bilateral matching and template matching) to other CU modes. If a FRUC matching mode is the most efficient one, video encoder 20 may set a FRUC flag to true for the CU and use the related matching mode.

FRUC may also be built on top of a more complicated motion model. In U.S. Provisional Application No. 62/403,057, filed on Sep. 30, 2016, it is proposed to use bilateral matching to derive affine motion information at decoder side.

Bi-directional optical flow in JEM is discussed in the following section.

In E. Alshina, A. Alshin, J.-H. Min, K. Choi, A. Saxena, M. Budagavi, "Known tools performance investigation for next generation video coding", ITU—Telecommunications Standardization Sector, STUDY GROUP 16 Question 6, Video Coding Experts Group (VCEG), VCEG-AZ05, June. 2015, Warsaw, Poland and A. Alshin, E. Alshina, T. Lee, "Bi-directional optical flow for improving motion compensation", Picture Coding Symposium (PCS), Nagoya, Japan, 2010, a method called bi-directional optical flow (BIO) was proposed. BIO is based on pixel level optical flow. In some examples, video encoder 20 and/or video decoder 30 may apply BIO only to blocks which have both forward and backward prediction.

Give a pixel value $I_t$ at time t, its first order Taylor expansion is $$I_t = I_{t0} + \frac{\partial I_{t0}}{\partial t}(t - t0) \quad (7)$$

where $I_{t0}$ is on the motion trajectory of $I_t$. That is, the motion from $I_{t0}$ to $I_t$ is considered in the formula.

Under the assumption of optical flow $$0 = \frac{dI}{dt} = \frac{\partial I}{\partial t} + \frac{\partial I}{\partial x} \cdot \frac{\partial x}{\partial t} + \frac{\partial I}{\partial y} \cdot \frac{\partial y}{\partial t}$$

$$\Rightarrow \frac{\partial I}{\partial t} = -\frac{\partial I}{\partial x} \cdot \frac{\partial x}{\partial t} - \frac{\partial I}{\partial y} \cdot \frac{\partial y}{\partial t}$$

Let $$G_x = \frac{\partial I}{\partial x}, G_y = \frac{\partial I}{\partial y}$$

(gradient), equation (7) becomes $$I_t = I_{t0} - G_{x0} \cdot \frac{\partial x}{\partial t} \cdot (t - t_0) - G_{y0} \cdot \frac{\partial y}{\partial t} \cdot (t - t_0) \quad (8)$$

Regarding $$\frac{\partial x}{\partial t} \text{ and } \frac{\partial y}{\partial t}$$

as the moving speed, $V_{x0}$ and $V_{y0}$ to represent $$\frac{\partial x}{\partial t} \text{ and } \frac{\partial y}{\partial t}.$$

As such, equation (8) becomes $$I_t = I_{t0} - G_{x0} \cdot V_{x0} \cdot (t-t_0) - G_{y0} \cdot V_{y0} \cdot (t-t_0) \quad (9)$$

Suppose video encoder 20 and/or video decoder 30 have a forward reference at $t_0$ and a backward reference at $t_1$, and $$t_0 - t = t - t_1 = \Delta t = 1$$

As such, equation (9) becomes $$I_t = I_{t0} - G_{x0} \cdot V_{x0} \cdot (t - t_0) - G_{y0} \cdot V_{y0} \cdot (t - t_0) = \quad (10)$$
$$I_{t0} + G_{x0} \cdot V_{x0} + G_{y0} \cdot V_{y0}$$

$$I_t = I_{t1} - G_{x1} \cdot V_{x1} \cdot (t - t_1) - G_{y1} \cdot V_{y1} \cdot (t - t_1) =$$
$$I_{t1} - G_{x1} \cdot V_{x1} - G_{y1} \cdot V_{y1}$$

$$\Rightarrow I_t = \frac{I_{t0} + I_{t1}}{2} + \frac{(G_{x0} \cdot V_{x0} - G_{x1} \cdot V_{x1}) + (G_{y0} \cdot V_{y0} - G_{y1} \cdot V_{y1})}{2}$$

It is further assumed $V_{x0} = V_{x1} = V_x$ and $V_{y0} = V_{y1} = V_y$ since the motion is along the trajectory. As such, equation (10) becomes $$I_t = \frac{I_{t0} + I_{t1}}{2} + \frac{(G_{x0} - G_{x1}) \cdot V_x + (G_{y0} - G_{y1}) \cdot V_y}{2} = \quad (11)$$
$$\frac{I_{t0} + I_{t1}}{2} + \frac{\Delta G_x \cdot V_x + \Delta G_y \cdot V_y}{2}$$

Where $\Delta G_x = G_{x0} - G_{x1}$, $\Delta G_y = G_{y0} - G_{y1}$ may be calculated based on reconstructed references. Because $$\frac{I_{t0} + I_{t1}}{2}$$

is the regular bi-prediction, $$\frac{\Delta G_x \cdot V_x + \Delta G_y \cdot V_y}{2}$$

is called BIO offset hereafter for convenience.

$V_x$ and $V_y$ are derived at both video encoder 20 and/or video decoder 30 by minimizing following distortion $$\min\left\{\sum_{block} ((I_{t0} + G_{x0} \cdot V_x + G_{y0} \cdot V_y) - (I_{t1} - G_{x1} \cdot V_x - G_{y1} \cdot V_y))^2\right\} = \quad (11\text{-B})$$
$$\min\left\{\sum_{block} (\Delta I + (G_{x0} + G_{x1}) \cdot V_x + (G_{y0} + G_{y1}) \cdot V_y)^2\right\}$$

With the derived $V_x$ and $V_y$, video encoder 20 and/or video decoder 30 may calculate the final prediction of the block is calculated with equation (11). $V_x$ and $V_y$ are referred to herein as BIO motion.

Figure 11:
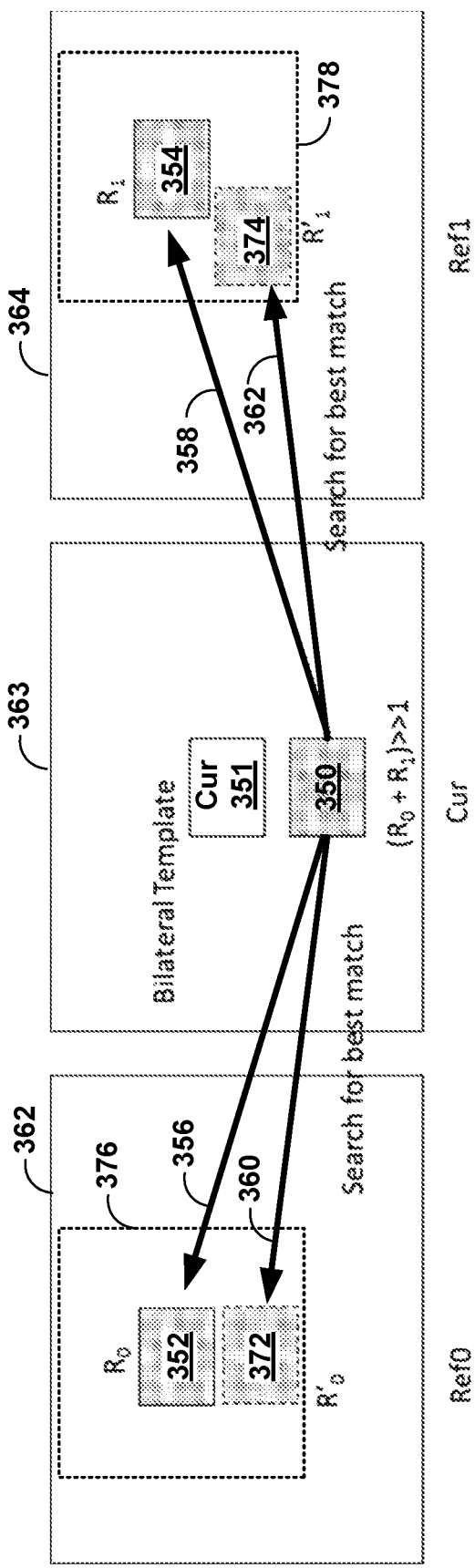
FIG. 11 is a conceptual diagram illustrating an example of decoder side motion derivation based on bilateral template matching.

FIG. 11 is a conceptual diagram illustrating an example of decoder-side motion derivation based on bilateral template matching. In X. Chen, J. An, J. Zheng, "Decoder-Side Motion Vector Refinement Based on Bilateral Template Matching", JVET-D0029, Chengdu, China, October 2016, a decoder side motion derivation method was proposed based a bilateral template matching. Video encoder 20 and/or video decoder 30 may generate a bilateral template 350 as a weighted combination of the two prediction blocks, from the initial $MV_0$ of list0 and $MV_1$ of list1 respectively, as shown in FIG. 11. For example, video encoder 20 and/or video decoder 30 may generate a bilateral template 350 for a pixel 'n', also referred to herein as simply "$T_n$,", as a weighted combination of first input reference block for the pixel 'n' (referred to herein as simply "$R_{0,n}$") 352 and second input reference block 354 for the pixel 'n' (referred to herein as simply "$R_{1,n}$") from the initial $MV_0$ 356 of list0 and $MV_1$ 358 of list1 respectively.

The template matching operation may include calculating cost measures between the generated template $T_n = (R_{0,n} + R_{1,n})/2$ and the sample region (around the initial prediction block) in the reference picture. For each of the two reference pictures, the MV that yields the minimum template cost is considered as the updated MV of that list to replace the original one, i.e., $$MV_0' = \arg\min\{R'_{0,n} - T_n\} \qquad (12)$$

$$MV_1' = \arg\min\{R'_{1,n} - T_n\} \qquad (13)$$

Video encoder 20 and/or video decoder 30 may use the two new MVs, e.g., $MV_0'$ 360 and $MV_1'$ 362 as shown in FIG. 11, for regular bi-prediction. In some examples, video encoder 20 and/or video decoder 30 may use the sum of absolute differences (SAD) as cost measure.

Video encoder 20 and/or video decoder 30 may apply DMVD for merge mode of bi-prediction with one from the reference picture in the past and the other from reference picture in the future, without the transmission of an additional syntax element. In JEM4.0, when LIC, affine, sub-CU merge candidate or FRUC is selected for one CU, the technique is not applied.

However, a video coder configured to apply equations (12) and (13) may have a relatively high complexity when many points needed to be matched. Moreover, a video coder configured to apply matching methods for MV search and derivation, such as SAD and Sum Square Error (SSE), are not every efficient, as only pixel information of a block is considered. Further, a video coder configured to apply equations (12) and (13) may use division when solving MVs in BIO, which is not friendly in hardware design. That is, division operations are hardware-intensive.

In accordance with one or more techniques described herein, video encoder 20 and/or video decoder 30 may be configured to apply bilateral template matching for the decoder side motion derivation based on gradient information.

Assuming $MV_0' = MV_0 + dV_0$ and $MV_1' = MV_1 + dV_1$ where $MV_0$ and $MV_1$ are input motion vectors for a block, $MV_0'$ 360 and $MV_1'$ 362 are motion vectors for the block after refinement, and $dV_0$ and $dV_1$ are the difference between the input motion vectors (e.g., $MV_0$ 356 and $MV_1$ 358) and the refined motion vectors (e.g., $MV_0'$ and $MV_1'$.

The first order Taylor expansion of $R'_{0,n}$ at $MV_0$ 356 for each pixel 'n' is $$R'_{0,n} = R_{0,n} + G_{0x,n} \cdot dV_{0x} + G_{0y,n} \cdot dV_{0y} \qquad (14)$$

where $G_{0x,n}$ and $G_{0y,n}$ represent the gradient of $R_{0,n}$ 352 for the List0 at x and y directions, respectively, $R_{0,n}$ 352 is a first pixel predictor before refinement, $R_{0,n}'$ 372 is a first refined pixel predictor, $dV_{0x}$ and $dV_{0y}$ are derived delta motion vectors by gradient-based matching.

As used herein, the gradient value of a pixel (e.g., $G_{0x,n}$, $G_{0y,n}$, etc.) may be regarded as the slope of pixel value change at that pixel. A pixel value change is related to direction. As such, $G_{0x,n}$ refers to a x direction (e.g., a horizontal component) gradient and $G_{0y,n}$ refers to a y-direction (e.g., a vertical component) gradient. The gradient information can be calculated based on pixel values of a block. Any suitable filter may be used to calculate gradient information. For example, a Sobel operator (https://en.wikipedia.org/wiki/Sobel_operator) is widely used in image processing for gradient calculation. In one example, techniques described herein may use a Sobel operator and another gradient filter (e.g., [-2 9 0 9 2]/16) to calculate gradient information (e.g., $G_{0x,n}$, $G_{0y,n}$, etc.).

Similarly, the first order Taylor expansion of $R'_{1,n}$ 374 at $MV_1$ 358 is $$R'_{1,n} = R_{1,n} + G_{1x,n} \cdot dV_{1x} + G_{1y,n} \cdot dV_{1y} \qquad (15)$$

where $R_{1,n}$ 354 is a second pixel predictor before refinement and $R_{1,n}'$ 374 is a second refined pixel predictor, $G_{1x,n}$ and $G_{1y,n}$ are the gradient of $R_{1,n}$ for the List1 predictors at x and y directions, respectively, $dV_{1x}$ and $dV_{1y}$ are derived delta motion vectors by gradient-based matching.

Applying (14) and (15) into (12) and (13) results in $$MV_0' = \qquad (16)$$
$$\arg\min\{R'_{0,n} - T_n\} = \arg\min\left\{\frac{R_{0,n} - R_{1,n}}{2} + G_{0x,n} \cdot dV_{0x} + G_{0y,n} \cdot dV_{0y}\right\}$$

$$MV_1' = \qquad (17)$$
$$\arg\min\{R'_{1,n} - T_n\} = \arg\min\left\{\frac{R_{1,n} - R_{0,n}}{2} + G_{1x,n} \cdot dV_{1x} + G_{1y,n} \cdot dV_{1y}\right\}$$

where $T_n$ is the bilateral template 350 is defined by $T_n = (R_{0,n} + R_{1,n})/2$ (see above with respect to equation (12)). That is, for instance, bilateral template 350 may be initially defined as the average of input reference block $R_{0,n}$ 352 and $R_{1,n}$ 354. Said differently, for example, video encoder 20 and/or video decoder 30 may determine a bi-predicted MV for a block 351 of video data. In this example, the bi-predicted MV predictor indicates $R_{0,n}$ 352 and $R_{1,n}$ 354.

The following discusses instances when matching methods for MV searching and derivation, SAD or SSE is used, like $(R_{0,n} - R_{1,n})$. If the gradient part is also considered as a part of matching, namely regard the whole formula arg min $$\left\{\frac{R_{0,n} - R_{1,n}}{2} + G_{0x,n} \cdot dV_{0x} + G_{1x,n} \cdot dV_{1x}\right\}$$

as matching, (16) and (17) actually show that the final $MV_0'$ 360 and $MV_1'$ 362 may be obtained by gradient based matching. Said differently, for example, video encoder 20 and/or video decoder 30 may refine the bi-predicted MV predictor (e.g., bilateral template 363) using gradient information (e.g., $G_{1x,n}$, $G_{1x,n}$, $G_{1x,n}$, $G_{1y,n}$, etc.) to determine a refined bi-predicted MV predictor indicating a first refined reference block (e.g., $R_{0,n}'$ 372) that is within a search range 376 from the first input reference block (e.g., $R_{0,n}$ 352) and a second refined reference block (e.g., $R_{1,n}'$ 374) that is within search range 378 from the second input reference block (e.g., $R_{1,n}$ 354). In some examples, video encoder 20 may generate a bitstream that includes one or more syntax elements that indicate the search range.

As with gradient based matching, more information is considered during the MV search/derivation process, the MV obtained with gradient based matching looks better than conventional SAD/SSE based matching. One reason for the coding benefit reported in X. Chen, J. An, J. Zheng, "Decoder-Side Motion Vector Refinement Based on Bilateral Template Matching", JVET-D0029, Chengdu, China, October 2016.

In the case that reference $R_{0,n}$ 352 and $R_{1,n}$ 354 are temporally at different sides of the current frame, it can be further assumed that $$dV_0 = -\frac{TD_0}{TD_1} \cdot dV_1$$

where $TD_0$ ($TD_1$) is the temporal distance between $R_{0,n}$ ($R_{1,n}$) and the current frame 363. That is, $TD_0$ is the temporal distance between $R_0$ 352 and the current frame 363. Similarly, $TD_1$ is the temporal distance between $R_1$ 374 and the current frame 363.

$MV_0'$ 360 and $MV_1'$ 362 may be derived by minimizing the distortion (e.g., in terms of sum absolute difference or sum square difference) between $R_{0,n}'$ 372 and $R_{1,n}'$ 374, for example, $$MV_0' = MV_0 + dV \cdot \frac{TD_0}{TD_1} \quad (18)$$

$$MV_1' = MV_1 - dV$$

$$dV = \mathrm{argmin}\{R_{0,n}' - R_{1,n}'\}$$

$$= \mathrm{argmin}\left\{\begin{array}{l}(R_{0,n} - R_{1,n}) + \left(G_{0x,n} \cdot \frac{TD_0}{TD_1} + G_{1x,n}\right) \cdot \\ dV_x + \left(G_{0y,n} \cdot \frac{TD_0}{TD_1} + G_{1y,n}\right) \cdot dV_y\end{array}\right\}$$

wherein $MV_0'$ is a first refined motion vector specifying the first refined reference block, $MV_1'$ is a second refined motion vector specifying the second refined reference block, $MV_0$ is a first input motion vector specifying the first input reference block, $MV_1$ is a second input motion vector specifying the second input reference block, $dV$ is a derived delta motion vector for a block, $TD_0$ is a temporal distance between a current frame for the block and a first reference frame for the first input reference block, $TD_1$ is a temporal distance between the current frame and a second reference frame for the second input reference block, $R_{0,n}$ is the first input reference block for a pixel, $R_{1,n}$ is the second input reference block for the pixel, $G_{0x,n}$ is a first horizontal pixel gradient of the first input reference block for the pixel, $G_{1x,n}$ is a second horizontal pixel gradient of the second input reference block for the pixel, $dV_x$ is a horizontal component of the derived delta motion vector for a block, $G_{0y,n}$ is a first vertical pixel gradient of the first input reference block for the pixel, $G_{1y,n}$ is a second vertical pixel gradient of the second input reference block for the pixel, and $dV_y$ is a vertical component of the derived delta motion vector for a block.

For simplicity, $$\frac{TD_0}{TD_1}$$

may be regarded as 1 so that equation (18) is simplified as $$MV_0' = MV_0 + dV$$

$$MV_1' = MV_1 - dV$$

$$dV = \mathrm{arg\,min}\{R_{0,n}' - R_{1,n}'\} = \mathrm{arg\,min}\{(R_{0,n} - R_{1,n}) + (G_{0x,n} + G_{1x,n}) \cdot dV_x + (G_{0y,n} + G_{1y,n}) \cdot dV_y\}$$

In the case that reference $R_{0,n}$ 352 and $R_{1,n}$ 354 are temporally at the same side of current frame 363, it can be further assumed that $$dV_0 = \frac{TD_0}{TD_1} \cdot dV_1.$$

Then $MV_0'$ 360 and $MV_1'$ 362 may be derived by minimizing the distortion between $R_{0,n}'$ 372 and $R_{1,n}'$ 374, for example, $$MV_0' = MV_0 + dV \cdot \frac{TD_0}{TD_1} \quad (19)$$

$$MV_1' = MV_1 + dV$$

$$dV = \mathrm{argmin}\{R_{0,n}' - R_{1,n}'\}$$

$$= \mathrm{argmin}\left\{\begin{array}{l}(R_{0,n} - R_{1,n}) + \left(G_{0x,n} \cdot \frac{TD_0}{TD_1} + G_{1x,n}\right) \cdot \\ dV_x + \left(G_{0y,n} \cdot \frac{TD_0}{TD_1} + G_{1y,n}\right) \cdot dV_y\end{array}\right\}$$

Note that with equations (18) and/or (19), gradient information is also considered in matching process while the bilateral template $(R_{0,n}+R_{1,n})/2$ is not needed any more. Another advantage of equations (18) and/or (19) is lower complexity. For equations (12) and (13), regular interpolation may be used to generate $R_{0,n}$ 352 and $R_{1,n}$ 354, and the related template $T_n$ if $R_{0,n}$ 352 and $R_{1,n}$ 354 are/is on fractional-pixel position. While for equations (18) and/or (19), regular interpolation is based on first order Taylor expansion. Theoretically, it is accurate as long as dV is small.

In accordance with one or more techniques described herein, video encoder 20 and/or video decoder 30 may be configured for a bi-predicted MV predictor that is refined using a matching method with gradient information counted, as described above. For instance, video encoder 20 and/or video decoder 30 may be configured for a bi-predicted MV predictor that is refined using equations (18) or (19).

In some examples, a bi-predicted MV predictor may be a merge predictor (candidate) or an AMVP predictor. That is, video encoder 20 and/or video decoder 30 may use the gradient-based matching techniques of this disclosure only for bi-predicted MV predictors in merge mode, in one example. In some examples, video encoder 20 and/or video decoder 30 may use the gradient-based matching techniques of this disclosure only for bi-predicted MV predictors in AMVP mode. In some examples, video encoder 20 and/or video decoder 30 may use the gradient-based matching techniques of this disclosure for bi-predicted MV predictors in both AMVP mode and merge mode.

In some examples, a bi-predicted MV predictor includes two MVs which point to two different reference blocks. That is, for example, video encoder 20 and/or video decoder 30 may use the gradient-based matching techniques of this disclosure for a bi-predicted MV predictor that includes two MVs which point to two different reference blocks. For instance, video encoder 20 and/or video decoder 30 may use the gradient-based matching techniques of this disclosure for a bi-predicted MV predictor that includes MV 356 which points to first input reference block (e.g., $R_{0,n}$ 352) and MV 358 which points to second input reference block (e.g., $R_{1,n}$ 354).

In some examples, the two reference blocks must be in two different reference pictures. That is, in some examples, video encoder 20 and/or video decoder 30 may use the gradient-based matching techniques of this disclosure for a bi-predicted MV predictor that includes two MVs which point to two different reference blocks that must be in two different reference pictures. For instance, video encoder 20 and/or video decoder 30 may refine a bi-predicted MV predictor that indicates $MV_0$ 356 which points to $R_{0,n}$ 352 of reference picture 362 and $MV_1$ 358 which points to $R_{1,n}$ 354 of reference picture 364.

In some examples, however, the two reference blocks may be in the same reference picture. That is, in some examples, video encoder 20 and/or video decoder 30 may use the gradient-based matching techniques of this disclosure for a bi-predicted MV predictor that includes two MVs which point to two different reference blocks that must be in two different reference pictures. In some examples, video encoder 20 and/or video decoder 30 may use the gradient-based matching techniques of this disclosure for bi-predicted MV predictors that may include two MVs which point to two different reference blocks that may be in the same reference picture or in two different reference pictures.

In some examples, if the bi-predicted MV predictor is a merge candidate, and the two MVs are in proportion to temporal distance, the MV predictor is not refined (unchanged). That is, video encoder 20 and/or video decoder 30 may not refine the MV predictor if the bi-predicted MV predictor is a merge candidate and the two MVs are in proportion to temporal distance. For example, the two MVs are in proportion to temporal distance if $$\frac{MV_0}{TD_0} = -\frac{MV_1}{TD_1}$$

when the two references are temporally at the different sides of the current frame or $$\frac{MV_0}{TD_0} = \frac{MV_1}{TD_1}$$

when the two reverences are temporally at the same side of the current frame. That is, video encoder 20 and/or video decoder 30 may determine that the two MVs are in proportion to temporal distance if $$\frac{MV_0}{TD_0} = -\frac{MV_1}{TD_1}$$

when the two references are temporally at the different sides of the current frame. Additionally, or alternatively, video encoder 20 and/or video decoder 30 may determine that the two MVs are in proportion to temporal distance if $$\frac{MV_0}{TD_0} = \frac{MV_1}{TD_1}$$

when the two references are temporally at the same side of the current frame. Said differently, for example, video encoder 20 and/or video decoder 30 may refine the bi-predicted MV predictor in response to determining the first input motion vector (e.g., $MV_0$ 356) and the second input motion vector (e.g., $MV_1$ 358) are not proportional in temporal distance from current frame 363 for block 351 or the bi-predicted MV predictor is not a merge candidate.

In some examples, equations (18), (19) and related variations/simplifications are examples of the matching method with gradient information counted. For example, video encoder 20 and/or video decoder 30 may derive the motion $dV_0$ and $dV_1$ in (18) and (19) with block matching, e.g., search $dV_0$ and $dV_1$ within a predefined or signaled range in order to minimize the matching difference. For instance, video encoder 20 may signal the search range in a bitstream such as a sequence parameter set (SPS), a picture parameter set (PPS), slice header, or other parameter sets. Said differently, for example, video encoder 20 may signal a bitstream that includes one or more syntax elements that indicate the search range.

Video encoder 20 and/or video decoder 30 may adaptively adjust the search range. For example, video encoder 20 and/or video decoder 30 may adaptively adjust the search range based on previously coded information, such as block size, coding mode, or whether particular coding tools (e.g., FRUC and BIO) are enabled. In some examples, video encoder 20 and/or video decoder 30 may use, within the search range, special search pattern, such as three-step search, diamond search, BBGDS Lurng-Kuo Liu, Ephraim Feig, "A block-based gradient descent search algorithm for block motion estimation in video coding," IEEE Trans. Circuits Syst. Video Technol., vol. 6, pp, 419-422, August 1996 or UCBDS Jo Yew Tham, Surendra Ranganath, Maitreya Ranganath, and Ashraf Ali Kassim, "A novel unrestricted center-biased diamond search algorithm for block motion estimation," IEEE Trans. Circuits Syst. Video Technol., vol. 8, pp. 369-377, August 1998.

Video encoder 20 and/or video decoder 30 may use different search techniques in different cases while for each case the search technique is predefined or signaled. In some instances, video encoder 20 and/or video decoder 30 may derive $dV_0$ and $dV_1$ with iterations. For instance, video encoder 20 and/or video decoder 30 may interpolate, for each round of iteration, $R_{0,n}$ and $R_{1,n}$ based on the newly derived $MV_0$ and $MV_1$ in the previous round. In some examples, video encoder 20 and/or video decoder 30 may interpolate, within each iteration, $R_{0,n}$ and $R_{1,n}$ only once, respectively. The search range may be the same for all iterations. For instance, video encoder 20 and/or video decoder 30 may use a same search range for all the iterations.

Video encoder 20 and/or video decoder 30 may adaptively adjust the search range based on a number of completed iteration. For instance, video encoder 20 and/or video decoder 30 may adaptively adjust the search range based on the times of iteration have been made. The number of iterations may be predefined or signaled in bitstream, such as in SPS, PPS, and slice header. For instance, video encoder 20 may generate a bitstream that includes a SPS, PPS, and slice header including one or more syntax elements that indicate the number of iterations.

In some examples, matching with consideration of gradient (e.g., the first technique) may also be used in FRUC. That is, video encoder 20 and/or video decoder 30 may use the gradient-based matching techniques of this disclosure in FRUC. For example, video encoder 20 and/or video decoder 30 may use the matching with consideration of gradient only in certain step(s) of FRUC, such as only during the refinement of whole block MV and/or the MV refinement from ⅛-pel precision to 1/16-pel precision. That is, video encoder 20 and/or video decoder 30 may use the gradient-based matching techniques of this disclosure in FRUC only during the refinement of whole block MV. Alternatively, video encoder 20 and/or video decoder 30 may use the gradient-based matching techniques of this disclosure in FRUC only during the refinement of the MV refinement from ⅛-pel precision to 1/16-pel precision. In some examples, video encoder 20 and/or video decoder 30 may use the gradient-based matching techniques of this disclosure in FRUC during both the refinement of whole block MV and the MV refinement from ⅛-pel precision to 1/16-pel precision.

In some examples, in BIO, video encoder 20 and/or video decoder 30 may derive MV information such as $V_x$ and $V_y$ in (11) a block level such as 4×4 block level by matching with consideration of gradient instead of solving the BIO equations. That is, video encoder 20 and/or video decoder 30 may derive MV information such $V_x$ and $V_y$ in (11) at a block level such as 4×4 block level by matching with consideration of gradient instead of solving BIO equations. For example, video encoder 20 and/or video decoder 30 may derive $V_x$ and $V_y$ by searching in a predefined or signaled, or an adaptively adjusted search range based on a predefined or signaled search pattern so that equation (11-B) is minimized. That is, in some examples, video encoder 20 and/or video decoder 30 may derive $V_x$ and $V_y$ by searching in a predefined or signaled search range so that (11-B) is minimized.

Additionally, or alternatively, video encoder 20 and/or video decoder 30 may derive $V_x$ and $V_y$ by searching in an adaptively adjusted search range based on a predefined or signaled search pattern so that (11-B) is minimized. The search precision, such as 1/16-pixel, 1/64-pixel, or 1/256-pixel, may be predefined, signaled, and/or adaptively adjusted based on previously coded information. Examples of search patterns may include, but are not limited to, three-step search, diamond search, BBGDS Lurng-Kuo Liu, Ephraim Feig, "A block-based gradient descent search algorithm for block motion estimation in video coding," IEEE Trans. Circuits Syst. Video Technol., vol. 6, pp. 419-422, August 1996 or UCBDS Jo Yew Tham, Surendra Ranganath, Maitreya Ranganath, and Ashraf Ali Kassim, "A novel unrestricted center-biased diamond search algorithm for block motion estimation," IEEE Trans. Circuits Syst. Video Technol., vol. 8, pp. 369-377, August 1998, other search patterns, or combinations of search patterns.

Video encoder 20 and/or video decoder 30 may use the above proposed gradient-based matching to derive or refine the motion information (e.g. motion vectors and reference index) and then use the refined motion information to derive the motion compensated prediction block as the final pixel predictors for current block. That is, for example, video encoder 20 and/or video decoder 30 may derive or refine the motion information (e.g. motion vectors and reference index) and video encoder 20 and/or video decoder 30 may use the refined motion information to derive the motion compensated prediction block as the final pixel predictors for current block. In some examples, video encoder 20 and/or video decoder 30 may directly use the delta MV ($dV_n$) and the gradient values ($G_{0x,n}$, $G_{0y,n}$, $G_{1x,n}$, $G_{1y,n}$) derived by the gradient-based matching to generate the final pixel predictor for current block without performing motion compensation using the derived or refined motion information. That is, for example, video encoder 20 and/or video decoder 30 may generate the final pixel predictor for a current block directly using the delta MV ($dV_n$) and derive the gradient values ($G_{0x,n}$, $G_{0y,n}$, $G_{1x,n}$, $G_{1y,n}$) by gradient-based matching without performing motion compensation using the derived or refined motion information. More specifically, for example, video encoder 20 and/or video decoder 30 may derive the pixel predictor for List0 and List1 using the below equations.

$$P_{0,n} = R_{0,n} + (G_{0x,n} \cdot dV_{0x} + G_{0y,n} \cdot dV_{0y})$$

$$P_{1,n} = R_{1,n} + (G_{1x,n} \cdot dV_{1x} + G_{1y,n} \cdot dV_{1y})$$

Where $P_{0,n}$, $P_{1,n}$ are the final pixel predictor; $R_{0,n}$, $R_{1,n}$ are the pixel predictors before the refinement; $G_{0x,n}$, $G_{0y,n}$, $G_{1x,n}$, $G_{1y,n}$ are the horizontal and vertical gradient for the List0 and List1 predictors; the $dV_{0x}$, $dV_{0y}$, $dV_{1x}$, $dV_{1y}$ are the derived delta motion vectors by the gradient-based matching. For example, video encoder 20 and/or video decoder 30 may derive $dV_{0x}$, $dV_{0y}$, $dV_{1x}$, $dV_{1y}$ using equations (18) or (19).

Figure 12:
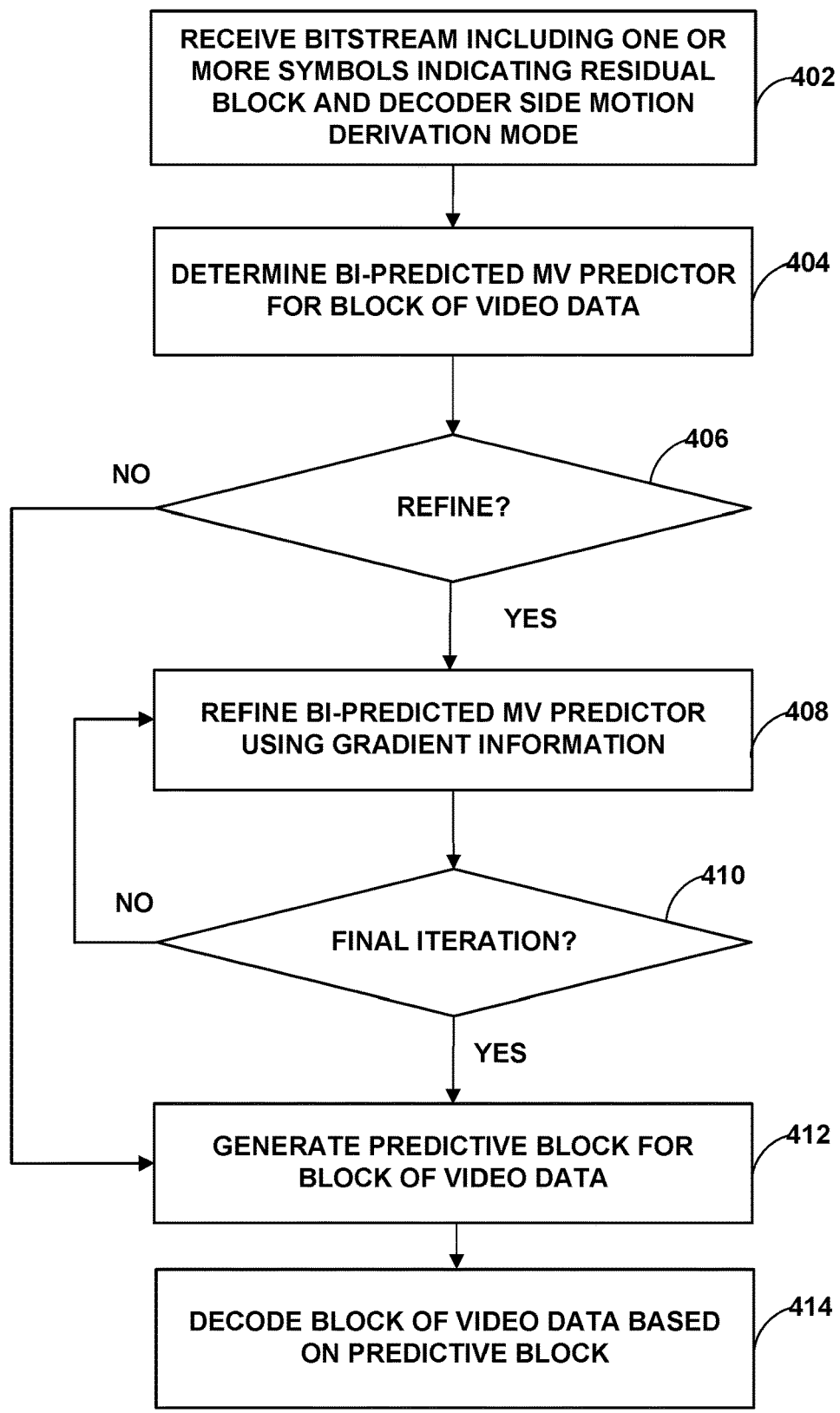
FIG. 12 is a flowchart illustrating an example method of decoding video data in accordance with one or more techniques described in this disclosure.

FIG. 12 is a flowchart illustrating an example method of decoding video data in accordance with one or more techniques described in this disclosure. Initially, video decoder 30 receives a bitstream including one or more symbols indicating residual block and a decoder side motion derivation mode (402). Video decoder 30 determines a bi-predicted MV predictor for a block of video data (404). For instance, video decoder 30 generates the bi-predicted MV predictor to include a merge predictor for the block of video data. In some instances, video decoder 30 generates the bi-predicted MV predictor to include an AMVP predictor for the block of video data.

Video decoder 30 determines whether to refine the bi-predicted MV predictor (406). For example, in response to determining the first input motion vector and the second input motion vector are not proportional in temporal distance from a current frame for the block and/or the bi-predicted MV predictor is not a merge candidate, video decoder 30 determines to refine the bi-predicted MV predictor ("YES" of step 406). In this example, in response to determining the first input motion vector and the second input motion vector is proportional in temporal distance from the current frame for the block and the bi-predicted MV predictor is a merge candidate, video decoder 30 determines to not refine the bi-predicted MV predictor ("NO" of step 406).

In response to determining to refine the bi-predicted MV predictor ("YES" of step 406), video decoder 30 refines the bi-predicted MV predictor using gradient information (408). For example, video decoder 30 searches within search region 376 of FIG. 11 for $R_{0,n}$' 372 based on a pixel gradient of $R_{0,n}$ 352 and searches within search region 378 for $R_{1,n}$' 374 based on a pixel gradient of $R_{1,n}$ 354. Again, the search region 378 may be signaled by one or more syntax element included in the bitstream, predefined, or adaptively generated.

Video decoder 30 determines whether a current iteration is a final iteration (410). For example, video decoder 30 determines the current iteration is a final iteration (e.g., terminate the iterations) when the current iterations corresponds (e.g., matches, is equal, etc.) to a pre-defined number of iterations. In another example, video decoder 30 determines the current iteration is a final iteration when the matching cost is smaller than (or equal to) a pre-defined threshold. In some examples, video decoder 30 may determine the current iteration is a final iteration when the matching cost is smaller than (or equal to) a pre-defined threshold or the iteration number reaches a pre-defined number.

In response to determining that the current iteration is not a final iteration ("NO" of step 408), video decoder 30 repeats step 408 using the refined bi-predicted MV predictor as an input predicted MV predictor. In response, however, to determining that the current iteration is a final iteration ("YES" of step 408) or in response to determining to not refine the bi-predicted MV predictor ("NO" of step 406), video decoder 30 generates a predictive block for block of video data (412). Video decoder 30 decodes block of video data based on predictive block (414).

Figure 13:
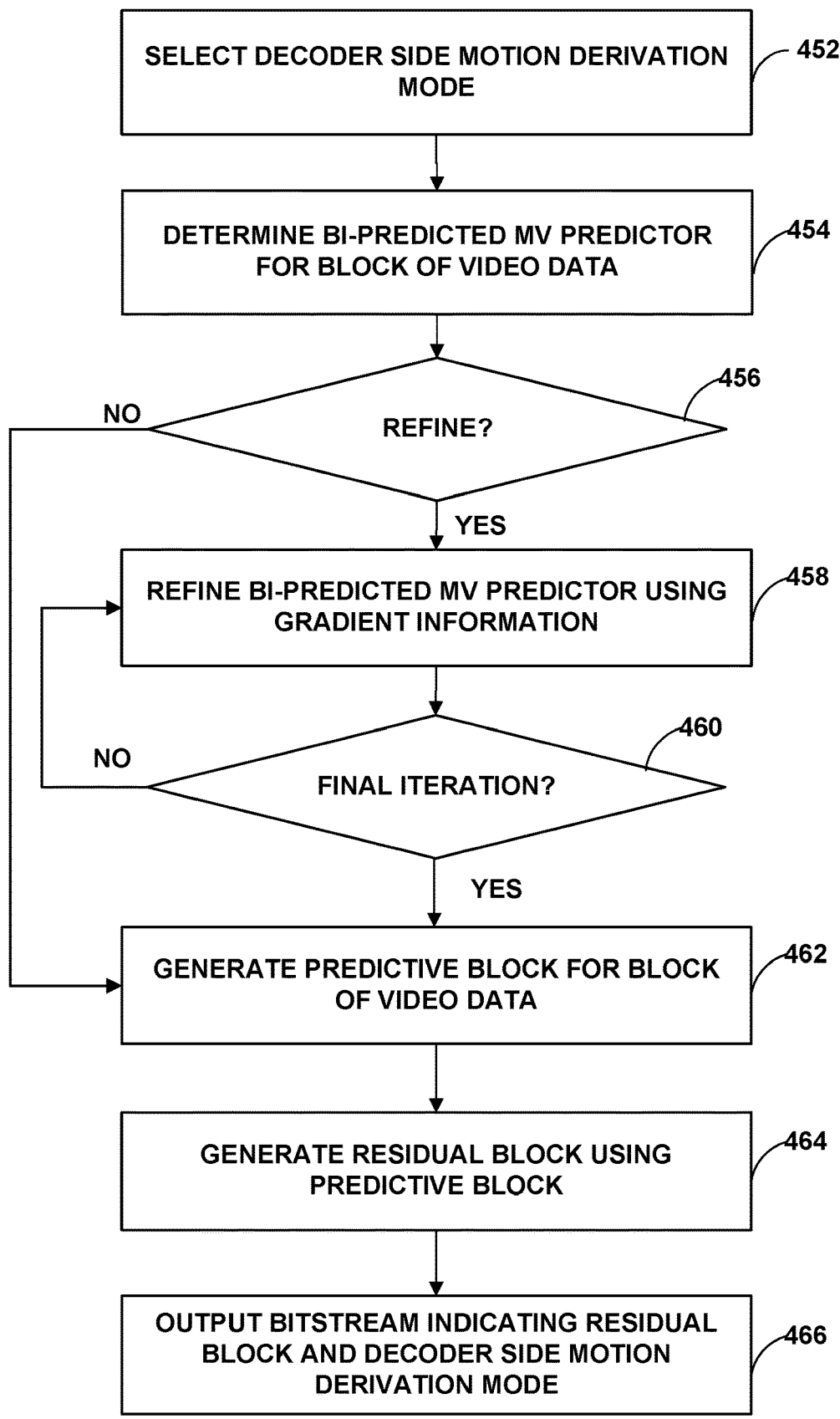
FIG. 13 is a flowchart illustrating an example method of encoding video data in accordance with one or more techniques described in this disclosure.

FIG. 13 is a flowchart illustrating an example method of encoding video data in accordance with one or more techniques described in this disclosure. Initially, video encoder 20 selects a decoder side motion derivation mode (452). Video encoder 20 determines a bi-predicted MV predictor for block of video data (454). For instance, video encoder 20 generates the bi-predicted MV predictor to include a merge predictor for the block of video data. In some instances, video encoder 20 generates the bi-predicted MV predictor to include an AMVP predictor for the block of video data.

Video encoder 20 determines whether to refine the bi-predicted MV predictor (456). For example, in response to determining the first input motion vector and the second input motion vector are not proportional in temporal distance from a current frame for the block and/or the bi-predicted MV predictor is not a merge candidate, encoder 20 determines to refine the bi-predicted MV predictor ("YES" of step 456). In this example, in response to determining the first input motion vector and the second input motion vector is proportional in temporal distance from the current frame for the block and the bi-predicted MV predictor is a merge candidate, video encoder 20 determines to not refine the bi-predicted MV predictor ("NO" of step 456).

In response to determining to refine the bi-predicted MV predictor ("YES" of step 456), video encoder 20 refines the bi-predicted MV predictor using gradient information (458). For example, video encoder 20 searches within search region 376 of FIG. 11 for $R_{0,n}'$ 372 based on a pixel gradient of $R_{0,n}$ 352 and searches within search region 378 for $R_{1,n}'$ 374 based on a pixel gradient of $R_{1,n}$ 354. Again, video encoder 20 may generate the bitstream to include one or more syntax element that indicate the search region 378. In some examples, the search region may be predefined, or adaptively generated.

Video encoder 20 determines whether a current iteration is a final iteration (460). For example, video encoder 20 determines the current iteration is a final iteration (e.g., terminate the iterations) when the current iterations corresponds (e.g., matches, is equal, etc.) to a pre-defined number of iterations. In another example, video encoder 20 determines the current iteration is a final iteration when the matching cost is smaller than (or equal to) a pre-defined threshold. In some examples, video encoder 20 may determine the current iteration is a final iteration when the matching cost is smaller than (or equal to) a pre-defined threshold or the iteration number reaches a pre-defined number.

In response to determining that the current iteration is not a final iteration ("NO" of step 460), video encoder 20 repeats step 458 using the refined bi-predicted MV predictor as an input predicted MV predictor. In response, however, to determining that the current iteration is a final iteration ("YES" of step 460) or in response to determining to not refine the bi-predicted MV predictor ("NO" of step 456), video encoder 20 generates a predictive block for block of video data (462). Video encoder 20 generates block of video data based on predictive block (464).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. A method of decoding video data, the method comprising:

determining, by a video decoder implemented in circuitry, a bi-predicted motion vector (MV) predictor for a block of video data in a current frame, the bi-predicted MV predictor indicating a first input reference block in a first reference frame and a second input reference block in a second reference frame;

refining, by the video decoder, the bi-predicted MV predictor for the block of video data using gradient information to determine a refined bi-predicted MV predictor indicating a first refined reference block that is within a search range from the first input reference block and a second refined reference block that is within the search range from the second input reference block;

wherein refining the bi-predicted MV predictor comprises minimizing, using the gradient information, a first template cost between the first refined reference block and a bilateral template that is generated based on the first input reference block and the second input reference block and minimizing, using the gradient information, a second template cost measure between the second refined reference block and the bilateral template;

generating, by the video decoder, a predictive block for the block of video data based on the refined bi-predicted MV predictor; and decoding, by the video decoder, the block of video data based on the predictive block.

2. The method of claim 1, wherein refining the bi-predicted MV predictor comprises calculating $$MV_0' = MV_0 + dV \cdot \frac{TD_0}{TD_1}$$

$$MV_1' = MV_1 - dV$$

$$dV = \mathrm{argmin}\Big\{(R_{0,n} - R_{1,n}) + \Big(G_{0x,n} \cdot \frac{TD_0}{TD_1} + G_{1x,n}\Big) \cdot dV_x + \Big(G_{0y,n} \cdot \frac{TD_0}{TD_1} + G_{1y,n}\Big) \cdot dV_y\Big\}$$

wherein $MV_0'$ is a first refined motion vector specifying the first refined reference block, $MV_1'$ is a second refined motion vector specifying the second refined reference block, $MV_0$ is a first input motion vector specifying the first input reference block, $MV_1$ is a second input motion vector specifying the second input reference block, $dV$ is a derived delta motion vector for a block, $TD_0$ is a temporal distance between a current frame for the block and a first reference frame for the first input reference block, $TD_1$ is a temporal distance between the current frame and a second reference frame for the second input reference block, $R_{0,n}$ is the first input reference block for a pixel, $R_{1,n}$ is the second input reference block for the pixel, $G_{0x,n}$ is a first horizontal pixel gradient of the first input reference block for the pixel, $G_{1x,n}$ is a second horizontal pixel gradient of the second input reference block for the pixel, $dV_x$ is a horizontal component of the derived delta motion vector for a block, $G_{0y,n}$ is a first vertical pixel gradient of the first input reference block for the pixel, $G_{1y,n}$ is a second vertical pixel gradient of the second input reference block for the pixel, and $dV_y$ is a vertical component of the derived delta motion vector for a block, and wherein the gradient information comprises the first horizontal pixel gradient, the second horizontal pixel gradient, the first vertical pixel gradient, and the second vertical pixel gradient.

3. The method of claim 1, wherein refining the bi-predicted MV predictor comprises calculating $$MV_0' = MV_0 + dV \cdot$$

$$MV_1' = MV_1 - dV$$

$$dV = \mathrm{argmin}\{(R_{0,n} - R_{1,n}) + (G_{0x,n} + G_{1x,n}) \cdot dV_x + (G_{0y,n} + G_{1y,n}) \cdot dV_y$$

wherein $MV_0'$ is a first refined motion vector specifying the first refined reference block, $MV_1'$ is a second refined motion vector specifying the second refined reference block, $MV_0$ is a first input motion vector specifying the first input reference block, $MV_1$ is a second input motion vector specifying the second input reference block, $dV$ is a derived delta motion vector for a block, $R_{0,n}$ is the first input reference block for a pixel, $R_{1,n}$ is the second input reference block for the pixel, $G_{0x,n}$ is a first horizontal pixel gradient of the first input reference block for the pixel, $G_{1x,n}$ is a second horizontal pixel gradient of the second input reference block for the pixel, $dV_x$ is a horizontal component of the derived delta motion vector for a block, $G_{0y,n}$ is a first vertical pixel gradient of the first input reference block for the pixel, $G_{1y,n}$ is a second vertical pixel gradient of the second input reference block for the pixel, and $dV_y$ is a vertical component of the derived delta motion vector for a block, and wherein the gradient information comprises the first horizontal pixel gradient, the second horizontal pixel gradient, the first vertical pixel gradient, and the second vertical pixel gradient.

4. The method of claim 1, wherein refining the bi-predicted MV predictor comprises calculating $$MV_0' = MV_0 + dV \cdot \frac{TD_0}{TD_1}$$

$$MV_1' = MV_1 + dV$$

$dV = \mathrm{argmin}$ $$\Big\{(R_{0,n} - R_{1,n}) + \Big(G_{0x,n} \cdot \frac{TD_0}{TD_1} - G_{1x}\Big) \cdot dV_x + \Big(G_{0y,n} \cdot \frac{TD_0}{TD_1} - G_{1y,n}\Big) \cdot dV_y\Big\}$$

wherein $MV_0'$ is a first refined motion vector specifying the first refined reference block, $MV_1'$ is a second refined motion vector specifying the second refined reference block, $MV_0$ is a first input motion vector specifying the first input reference block, $MV_1$ is a second input motion vector specifying the second input reference block, dV is a derived delta motion vector for a block, $TD_0$ is a temporal distance between a current frame for the block and a first reference frame for the first input reference block, $TD_1$ is a temporal distance between the current frame and a second reference frame for the second input reference block, $R_{0,n}$ is the first input reference block for a pixel, $R_{1,n}$ is the second input reference block for the pixel, $G_{0x,n}$ is a first horizontal pixel gradient of the first input reference block for the pixel, $G_{1x,n}$ is a second horizontal pixel gradient of the second input reference block for the pixel, $dV_x$ is a horizontal component of the derived delta motion vector for a block, $G_{0y,n}$ is a first vertical pixel gradient of the first input reference block for the pixel, $G_{1y,n}$ is a second vertical pixel gradient of the second input reference block for the pixel, and $dV_y$ is a vertical component of the derived delta motion vector for a block, and wherein the gradient information comprises the first horizontal pixel gradient, the second horizontal pixel gradient, the first vertical pixel gradient, and the second vertical pixel gradient.

5. The method of claim 1, further comprising:
receiving, by the video decoder, a bitstream that includes one or more syntax elements that indicate the search range.

6. The method of claim 1, wherein the search range is adaptively adjusted based on previously coded information.

7. The method of claim 1, wherein refining the bi-predicted MV predictor comprises:
iteratively searching for the first refined reference block and the second refined reference block a number of iterations.

8. The method of claim 7, wherein the search range is the same for all iterations of the number of iterations.

9. The method of claim 7, further comprising:
adaptively adjusting, by the video decoder, for each iteration of the number of iterations, the search range.

10. The method of claim 7, further comprising:
receiving, by the video decoder, a bitstream that includes one or more syntax elements that indicate the number of iterations.

11. The method of claim 1,
wherein the bi-predicted motion vector predictor includes a first input motion vector specifying the first input reference block and a second input motion vector specifying the second input reference block; and
wherein refining the bi-predicted MV predictor is in response to determining the first input motion vector and the second input motion vector are not proportional in temporal distance from a current frame for the block.

12. The method of claim 11, further comprising:
determining, by the video decoder, that the first input motion vector and the second input motion vector are proportional in temporal distance from the current frame if $$\frac{MV_0}{TD_0} = -\frac{MV_1}{TD_1}$$

when the first input reference block and the second input reference block are temporally at different sides of the current frame or $$\frac{MV_0}{TD_0} = \frac{MV_1}{TD_1}$$

when the first input reference block and the second input reference block are temporally at a same side of the current frame,
wherein $MV_0$ is a first input motion vector specifying the first input reference block, $MV_1$ is a second input motion vector specifying the second input reference block, $TD_0$ is a temporal distance between a current frame for the block and a first reference frame for the first input reference block, and $TD_1$ is a temporal distance between the current frame and a second reference frame for the second input reference block.

13. The method of claim 1, wherein the bi-predicted motion vector predictor comprises a merge predictor or an advanced motion vector prediction (AMVP) predictor.

14. A device for decoding video data, the device comprising:
a memory configured to store the video data; and
one or more processors configured to:
determine a bi-predicted motion vector (MV) predictor for a block of video data in a current frame, the bi-predicted MV predictor indicating a first input reference block in a first reference frame and a second input reference block in a second reference frame;
refine the bi-predicted MV predictor for the block of video data using gradient information to determine a refined bi-predicted MV predictor indicating a first refined reference block that is within a search range from the first input reference block and a second refined reference block that is within the search range from the second input reference block;
wherein, to refine the bi-predicted MV predictor, the one or more processors are configured to minimize, using the gradient information, a first template cost between the first refined reference block and a bilateral template that is generated based on the first input reference block and the second input reference block and minimize, using the gradient information, a second template cost measure between the second refined reference block and the bilateral template;
generate a predictive block for the block of video data based on the first refined reference block and the second refined reference block; and
generate the block of video data based on the predictive block.

15. The device of claim 14, wherein, to refine the bi-predicted MV predictor, the one or more processors are configured to calculate $$MV'_0 = MV_0 + dV \cdot \frac{TD_0}{TD_1}$$

$$MV'_1 = MV_1 - dV$$

$$dV = \mathrm{argmin}$$

$$\left\{ (R_{0,n} - R_{1,n}) + \left(G_{0x,n} \cdot \frac{TD_0}{TD_1} - G_{1x,n}\right) \cdot dV_x + \left(G_{0y,n} \cdot \frac{TD_0}{TD_1} + G_{1y,n}\right) \cdot dV_y \right\}$$

wherein $MV_0'$ is a first refined motion vector specifying the first refined reference block, $MV_1'$ is a second refined motion vector specifying the second refined reference block, $MV_0$ is a first input motion vector specifying the first input reference block, $MV_1$ is a second input motion vector specifying the second input reference block, dV is a derived delta motion vector for a block, $TD_0$ is a temporal distance between a current frame for the block and a first reference frame for the first input reference block, $TD_1$ is a temporal distance between the current frame and a second reference frame for the second input reference block, $R_{0,n}$ is the first input reference block for a pixel, $R_{1,n}$ is the second input reference block for the pixel, $G_{0x,n}$ is a first horizontal pixel gradient of the first input reference block for the pixel, $G_{1x,n}$ is a second horizontal pixel gradient of the second input reference block for the pixel, $dV_x$ is a horizontal component of the derived delta motion vector for a block, $G_{0y,n}$ is a first vertical pixel gradient of the first input reference block for the pixel, $G_{1y,n}$ is a second vertical pixel gradient of the second input reference block for the pixel, and $dV_y$ is a vertical component of the derived delta motion vector for a block, and wherein the gradient information comprises the first horizontal pixel gradient, the second horizontal pixel gradient, the first vertical pixel gradient, and the second vertical pixel gradient.

16. The device of claim 14, wherein, to refine the bi-predicted MV predictor, the one or more processors are configured to calculate $$MV_0' = MV_0 + dV \cdot$$
$$MV_1' = MV_1 - dV$$
$$dV = \mathrm{argmin}\{(R_{0,n} - R_{1,n}) + (G_{0x,n} \cdot + G_{1x,n}) \cdot dV_x + (G_{0y,n} \cdot + G_{1y,n}) \cdot dV_y$$

wherein $MV_0'$ is a first refined motion vector specifying the first refined reference block, $MV_1'$ is a second refined motion vector specifying the second refined reference block, $MV_0$ is a first input motion vector specifying the first input reference block, $MV_1$ is a second input motion vector specifying the second input reference block, dV is a derived delta motion vector for a block, $R_{0,n}$ is the first input reference block for a pixel, $R_{1,n}$ is the second input reference block for the pixel, $G_{0x,n}$ is a first horizontal pixel gradient of the first input reference block for the pixel, $G_{1x,n}$ is a second horizontal pixel gradient of the second input reference block for the pixel, $dV_x$ is a horizontal component of the derived delta motion vector for a block, $G_{0y,n}$ is a first vertical pixel gradient of the first input reference block for the pixel, $G_{1y,n}$ is a second vertical pixel gradient of the second input reference block for the pixel, and $dV_y$ is a vertical component of the derived delta motion vector for a block, and wherein the gradient information comprises the first horizontal pixel gradient, the second horizontal pixel gradient, the first vertical pixel gradient, and the second vertical pixel gradient.

17. The device of claim 14, wherein, to refine the bi-predicted MV predictor, the one or more processors are configured to calculate $$MV_0' = MV_0 + dV \cdot \frac{TD_0}{TD_1}$$
$$MV_1' = MV_1 + dV$$
$$dV = \mathrm{argmin}$$
$$\left\{(R_{0,n} - R_{1,n}) + \left(G_{0x,n} \cdot \frac{TD_0}{TD_1} - G_{1x}\right) \cdot dV_x + \left(G_{0y,n} \cdot \frac{TD_0}{TD_1} - G_{1y,n}\right) \cdot dV_y\right\}$$

wherein $MV_0'$ is a first refined motion vector specifying the first refined reference block, $MV_1'$ is a second refined motion vector specifying the second refined reference block, $MV_0$ is a first input motion vector specifying the first input reference block, $MV_1$ is a second input motion vector specifying the second input reference block, dV is a derived delta motion vector for a block, $TD_0$ is a temporal distance between a current frame for the block and a first reference frame for the first input reference block, $TD_1$ is a temporal distance between the current frame and a second reference frame for the second input reference block, $R_{0,n}$ is the first input reference block for a pixel, $R_{1,n}$ is the second input reference block for the pixel, $G_{0x,n}$ is a first horizontal pixel gradient of the first input reference block for the pixel, $G_{1x,n}$ is a second horizontal pixel gradient of the second input reference block for the pixel, $dV_x$ is a horizontal component of the derived delta motion vector for a block, $G_{0y,n}$ is a first vertical pixel gradient of the first input reference block for the pixel, $G_{1y,n}$ is a second vertical pixel gradient of the second input reference block for the pixel, and $dV_y$ is a vertical component of the derived delta motion vector for a block, and wherein the gradient information comprises the first horizontal pixel gradient, the second horizontal pixel gradient, the first vertical pixel gradient, and the second vertical pixel gradient.

18. The device of claim 14, wherein the one or more processors are configured to:
receive a bitstream that includes one or more syntax elements that indicate the search range.

19. The device of claim 14, wherein the search range is adaptively adjusted based on previously coded information.

20. The device of claim 14, wherein, to refine the bi-predicted MV predictor, the one or more processors are configured to:
iteratively search for the first refined reference block and the second refined reference block a number of iterations.

21. The device of claim 20, wherein the search range is the same for all iterations of the number of iterations.

22. The device of claim 20, wherein the one or more processors are configured to:
adaptively adjust, for each iteration of the number of iterations, the search range.

23. The device of claim 20, wherein the one or more processors are configured to:
receive a bitstream that includes one or more syntax elements that indicate the number of iterations.

24. The device of claim 14,
wherein the bi-predicted motion vector predictor includes a first input motion vector specifying the first input reference block and a second input motion vector specifying the second input reference block; and
wherein refining the bi-predicted MV predictor is in response to determining the first input motion vector and the second input motion vector are not proportional in temporal distance from a current frame for the block.

25. The device of claim 24, wherein the one or more processors are configured to:
determine that the first input motion vector and the second input motion vector are proportional in temporal distance from the current frame if $$\frac{MV_0}{TD_0} = -\frac{MV_1}{TD_1}$$

when the first input reference block and the second input reference block are temporally at different sides of the current frame or $$\frac{MV_0}{TD_0} = \frac{MV_1}{TD_1}$$

when the first input reference block and the second input reference block are temporally at a same side of the current frame,
wherein $MV_0$ is a first input motion vector specifying the first input reference block, $MV_1$ is a second input motion vector specifying the second input reference block, $TD_0$ is a temporal distance between a current frame for the block and a first reference frame for the first input reference block, and $TD_1$ is a temporal distance between the current frame and a second reference frame for the second input reference block.

26. The device of claim 14, wherein the bi-predicted motion vector predictor comprises a merge predictor or an advanced motion vector prediction (AMVP) predictor.

27. A method of encoding video data, the method comprising:
determining, by a video encoder implemented in circuitry, a bi-predicted motion vector (MV) predictor for a block of video data in a current frame, the bi-predicted MV predictor indicating a first input reference block in a first reference frame and a second input reference block in a second reference frame;
refining, by the video encoder, the bi-predicted MV predictor for the block of video data using gradient information to determine a refined bi-predicted MV predictor indicating a first refined reference block that is within a search range from the first input reference block and a second refined reference block that is within the search range from the second input reference block;
wherein refining the bi-predicted MV predictor comprises minimizing, using the gradient information, a first template cost between the first refined reference block and a bilateral template that is generated based on the first input reference block and the second input reference block and minimizing, using the gradient information, a second template cost measure between the second refined reference block and the bilateral template;
generating, by the video encoder, a predictive block for the block of video data based on the first refined reference block and the second refined reference block; and
generating, by the video encoder, a residual block using the predictive block.

28. A device for decoding video data, the device comprising:
a memory configured to store the video data; and
one or more processors configured to:
determine a bi-predicted motion vector (MV) predictor for a block of video data in a current frame, the bi-predicted MV predictor indicating a first input reference block in a first reference frame and a second input reference block in a second reference frame;
refine the bi-predicted MV predictor for the block of video data using gradient information to determine a refined bi-predicted MV predictor indicating a first refined reference block that is within a search range from the first input reference block and a second refined reference block that is within the search range from the second input reference block;
wherein, to refine the bi-predicted MV predictor, the one or more processors are configured to minimize, using the gradient information, a first template cost between the first refined reference block and a bilateral template that is generated based on the first input reference block and the second input reference block and minimize, using the gradient information, a second template cost measure between the second refined reference block and the bilateral template;
generate a predictive block for the block of video data based on the first refined reference block and the second refined reference block; and
generate a residual block using the predictive block.

* * * * *